United States Patent [19]
Motoyama et al.

[11] Patent Number: 6,022,180
[45] Date of Patent: Feb. 8, 2000

[54] CARTRIDGE TRANSFERRING ROBOT FOR LIBRARY APPARATUS

[75] Inventors: Nobuhiko Motoyama; Hiroshi Shibuya; Chikatsu Kato; Keiichi Saito; Daisuke Hori, all of Kawasaki, Japan

[73] Assignee: Fujitsu Limited, Kawasaki, Japan

[21] Appl. No.: 09/002,209

[22] Filed: Dec. 31, 1997

[30] Foreign Application Priority Data

Jul. 2, 1997 [JP] Japan .................................. 9-177037

[51] Int. Cl.[7] .................................................. B65G 63/00
[52] U.S. Cl. ........................ 414/277; 414/280; 414/283; 364/478.06
[58] Field of Search ........................ 364/478.06, 478.02, 364/478.04, 478.05, 478.03; 414/273, 274, 762, 765, 277, 280, 281, 283; 369/34, 36, 38; 360/92

[56] References Cited

U.S. PATENT DOCUMENTS

| | | | |
|---|---|---|---|
| 4,383,789 | 5/1983 | Takamatsu | 414/274 |
| 4,984,108 | 1/1991 | Grant et al. | 414/280 |
| 5,323,327 | 6/1994 | Carmichael et al. | 360/92 |
| 5,426,581 | 6/1995 | Kishi et al. | 364/478.06 |
| 5,508,859 | 4/1996 | Hu et al. | 369/34 |
| 5,532,931 | 7/1996 | Erickson, Jr. et al. | 364/478.06 |
| 5,631,785 | 5/1997 | Dang et al. | 360/92 |
| 5,767,647 | 6/1998 | Akiyama et al. | 364/478.06 |
| 5,781,369 | 7/1998 | Inazawa et al. | 360/92 |
| 5,818,723 | 10/1998 | Dimitri | 364/478.02 |
| 5,848,872 | 12/1998 | Manes et al. | 414/280 |

FOREIGN PATENT DOCUMENTS

| | | |
|---|---|---|
| 63-112859 | 5/1988 | Japan . |
| 1-211364 | 8/1989 | Japan . |

*Primary Examiner*—Christopher P. Ellis
*Assistant Examiner*—Isobel A. Parker
*Attorney, Agent, or Firm*—Greer, Burns & Crain

[57] ABSTRACT

A cartridge transferring robot for use in a library apparatus which is capable of certainly transferring a plurality of types of cartridges (media) to meet various needs from the users. In the present invention, for this purpose, in case where a plurality of types of cartridges are handled within the library apparatus, a picker section includes a type identifying mechanism to identify the type of the cartridge held in the picker section in a state of being gripped by a hand mechanism. Further, this invention is for transferring cartridges among a storage unit, a cartridge entry/exit station and a drive unit within a library apparatus storing a large number of cartridges such as magnetic tape cartridges and optical disk cartridges.

8 Claims, 25 Drawing Sheets

CARTRIDGE TRANSFERRING ROBOT FOR LIBRARY APPARATUS

BACKGROUND OF THE INVENTION

1) Field of the Invention

The present invention relates to a cartridge transferring robot for use in a library apparatus which stores a large number of cartridges such as magnetic tape cartridges and optical disk cartridges, with the cartridge transferring robot conveying the cartridges among a storage unit (or rack), a cartridge entry/exit station and a drive unit within the library apparatus.

2) Description of the Related Art

In general, a library apparatus functions as a large-capacity external storage unit, and a storage unit in its locker stores several thousands of cartridges each accommodating, for example, a magnetic tape as a storage medium. Access such as write/read of recording/recorded data is automatically done toward the storage medium within each of the cartridges.

Furthermore, in addition to the aforesaid storage unit for storing the cartridges, the library apparatus is equipped with a station [for example, a CAS (Cartridge Access Station), a DEE (Direct Entry/Exit), and an FES (Forced Exit Station)] for carrying out the entry of the cartridges from the external environment into the apparatus or vice versa, a plurality of magnetic tape drive units (which will be referred hereinafter to as MTUs) for conducting access such as write/read of recording/recorded data toward a storage medium (magnetic tape) within a cartridge, and a cartridge transferring robot [automatic transferring robot; which will be referred hereinafter to as an accessor (ACC)] for performing the conveyance among the storage unit, the cartridge entry/exit station and the MTU.

In the case of such a library apparatus, on receiving an access demand to one cartridge from a host unit or the like, the accessor moves to the storage unit to search the directing cartridge and then transfers that cartridge up to the MTU in a state of gripping or holding it through the use of a hand mechanism, thereby putting it in the MTU. Whereupon, the MTU processes the storage medium (magnetic tape) within the cartridge. The cartridge discharged from the MTU after the completion of the processing is regripped by the hand mechanism of the accessor and transferred up to the storage unit by that accessor to be stored in a given location.

In general, only one type of the cartridges is transferred by the accessor, and the library apparatus performs large-capacity backup of data through the use of that one type of cartridge (media). Accordingly, the accessor is naturally taken to have a function of transferring only one type of cartridge.

On the other hand, since the library apparatus is for backing up a large quantity of data, the users may desire to retain data through the use of two or more types of media but not one type of media. However, because as mentioned above the prior library apparatus is designed to handle only one type of media, this apparatus is incapable of meeting such requirements.

Furthermore, the difference between the types of media naturally causes the difference between the sizes (external dimensions or configurations) of the media, and hence, for certain insertion of the media with different sizes into storage units or MTUs, the accessor is required to always reset various types of media at a reference position. For this reason, difficulty is encountered to surely insert the various types of media into the storage units or MTUs corresponding to those types only in a manner that the accessor (automatic transferring robot) are designed to cope with transferring two or more types of media.

SUMMARY OF THE INVENTION

The present invention has been developed with a view to eliminating these problems, and it is therefore an object of the present invention to provide a cartridge transferring robot for a library apparatus which is capable of surely transferring a plurality of types of cartridges (media), thus meeting a variety of needs from the users.

For this purpose, in accordance with the present invention, in a library apparatus including at least a storage unit for storing cartridges each accommodating a storage medium, a cartridge entry/exit station for the entry/exit of the cartridge, and a drive unit for carrying out access to the storage medium within the cartridge, a cartridge transferring robot for use in the library apparatus is composed of a picker section having a hand mechanism for gripping the cartridge for insertion and extraction of the cartridge at cartridge conveyance within the library apparatus, and a moving mechanism for moving the picker section up to a given position, wherein the picker section includes a type identifying mechanism for, the case in which a plurality of types of cartridges are handled within the library apparatus, identifying the type of the cartridge held in the picker section in a state of being gripped by the hand mechanism.

In the case of the cartridge transferring robot for a library apparatus according to this invention, since the type identifying mechanism can identify the type of the cartridge held in the picker section, the processing (conveyance and insertion of cartridges to/into a storage unit or a drive unit corresponding to types of the cartridges, and other operations) conforming with the identification result becomes certainly possible, and a plurality of types of cartridges can be handled within one library apparatus.

The cartridge transferring robot is provided with a pair of left- and right-hand guide members for guiding the cartridge to be led into the picker section in a state of being gripped by the hand mechanism while holding the same cartridge from both of its sides. The interval between these paired guide members is set to be slightly larger than the largest of a plurality of types of cartridges. Further, the type identifying mechanism is composed of an actuator made to move in accordance with the irregularities (variation in height) of one side surface of the cartridge held in the picker section, a detection section for detecting the quantity of movements of this actuator, and an identifying section for identifying the type of the cartridge on the basis of the movement quantity of the actuator detected by the detection section.

With this arrangement, each of various types of cartridges is led into the interior of the picker section by the hand mechanism while being guided by the pair of left- and right-hand guide members. Further, the actuator moves (taking the opening and closing conditions) in accordance with the irregularities (external dimension) of one side surface of the cartridge introduced into the interior of the picker section. In this invention, utilizing the fact that its movement quantity varies in accordance with the external dimension of the cartridge (the type of the cartridge), the identifying section identifies the type of the cartridge on the basis of the quantity of movement of the actuator detected by the detection section.

In this case, the aforesaid actuator is composed of a roller rotating around a shaft perpendicular to the traveling plane of the cartridge while coming into contact with one side surface of the cartridge, an arm pivotally supporting this roller and fitted to the picker section to be swingable around a shaft normal to the traveling plane of the cartridge to swing in accordance with the irregularities of one side surface of the cartridge, a spring for biasing the arm to press the roller against the one side surface of the cartridge, and a flag made to project from the arm and shifting in accordance with the swinging action of the arm. The detection section comprises a photosensor undergoing the light-interception (blocking) by this flag depending upon the movement thereof, and the aforesaid identifying section identifies the type of the cartridge on the basis of the information about the light-interception from the photosensor.

With this arrangement, when the cartridge is taken into the interior of the picker section by the hand mechanism, the roller rotates to allow the movement of the cartridge while coming into contact with one side surface of the cartridge owing to the biasing force of the spring, thus making the arm swing in accordance with its irregularities. In synchronism with the swinging action of the arm, the flag moves, so that the photosensor detects the movement quantity of this flag as the light-interception information, with the identifying section identifying the type of the cartridge on the basis of the light-interception information from the photosensor.

Furthermore, the hand mechanism is controlled to regrip the cartridge in a state where the cartridge is introduced into the picker section, and at this cartridge regripping operation by the hand mechanism, the actuator receives the biasing force of the spring to press the other side surface of the cartridge against the other guide member, which finally serves as a positioning mechanism to always maintain a constant position of the other side surface of the cartridge within the picker section.

With the above-mentioned arrangement, although the hand mechanism operates to regrip the cartridge in a state where the cartridge is taken in the interior of the picker section, at this time, the roller placed into contact with the one side surface of the cartridge receives the biasing force of the spring through the arm to always press the other side surface of the cartridge against the one guide member irrespective of its type. Consequently, even in the case of handling various types of cartridges, within the picker section, the various types of cartridges can always be reset at a constant position (reference position) where the other side surface of the cartridge is brought into contact with the one guide member.

Still further, a locking member is provided to protrude from at least one of the pair of left- and right-hand guide members toward the cartridge side, with the locking member being put out of the way by the cartridge at the cartridge inserting and extracting operations by the hand mechanism while locking the cartridge at the cartridge regripping operation by the hand mechanism.

With this arrangement, when the hand mechanism operates to regrip the cartridge as mentioned above, if the cartridge is shifted from the interior of the picker section to the external, the cartridge is locked with the locking member to prevent the cartridge from falling from the interior of the picker section to the external.

Moreover, in the case of having a diagnostic function to check the dimensional accuracy by inserting and extracting a diagnostic cartridge into/from a diagnostic cell placed at a given position within the library apparatus, the type identifying mechanism identifies the diagnostic cartridge as one of a plurality of kinds of cartridges.

With this arrangement, the type identifying mechanism is capable of identifying not only the cartridge accommodating a storage medium but also a diagnostic cartridge, and in cases where the hand mechanism grips the diagnostic cartridge, the corresponding operation becomes possible.

Thus, the cartridge transferring robot for a library apparatus according to this invention can offer the following effects and advantages.

(1) Since it is possible to identify the kind of the cartridge held in the picker section, the processing corresponding to the identification results becomes certainly possible and a plurality of types of cartridges are treatable within one library apparatus and, hence, transferable, with result that it is possible to provide the easier-to-use apparatus for the users and further to meet various needs from the users.

(2) Since it is possible to identify the types of cartridges within the robot and, at the same time, to position the cartridge (reset the cartridge to a reference position), the cartridge can easily be inserted into the storage unit or drive unit conforming with its type.

(3) When the hand mechanism releases the cartridge in the positioning of the cartridge (reset to the reference position) within the robot, the break-out (jump-out) preventing locking member works to always surely maintain the cartridge within the picker section. Accordingly, it is possible to operate the library apparatus with a high reliability by inhibiting the break-out of the cartridge to the external irrespective of the occurrence of vibrations or abnormal actions of the robot itself.

(4) Even if using a special-purpose cartridge for diagnosis for diagnosing or checking whether or not the dimension of the accessor itself is out of order, it is possible to recognize that the cartridge used is for the purpose of the diagnosis, and therefore, the diagnosing operation for the robot itself is smoothly and surely feasible. At the switching from the diagnosis to the normal operation, even if the hand mechanism is in the state of gripping the diagnostic cartridge, because of the recognition thereof, it is possible to prevent a wrong operation that the apparatus gets into the normal action while the hand mechanism grips the diagnostic cartridge.

BRIEF DESCRIPTION OF THE DRAWINGS

FIG. 8A shows that a picker section is in a horizontal condition while FIG. 8B illustrates that the picker section is in a tilt condition;

DESCRIPTION OF THE PREFERRED EMBODIMENTS

An embodiment of the present invention will be described hereinbelow with reference to the drawings.

[1] Description of Entire Arrangement of Library Apparatus

Figure 1:
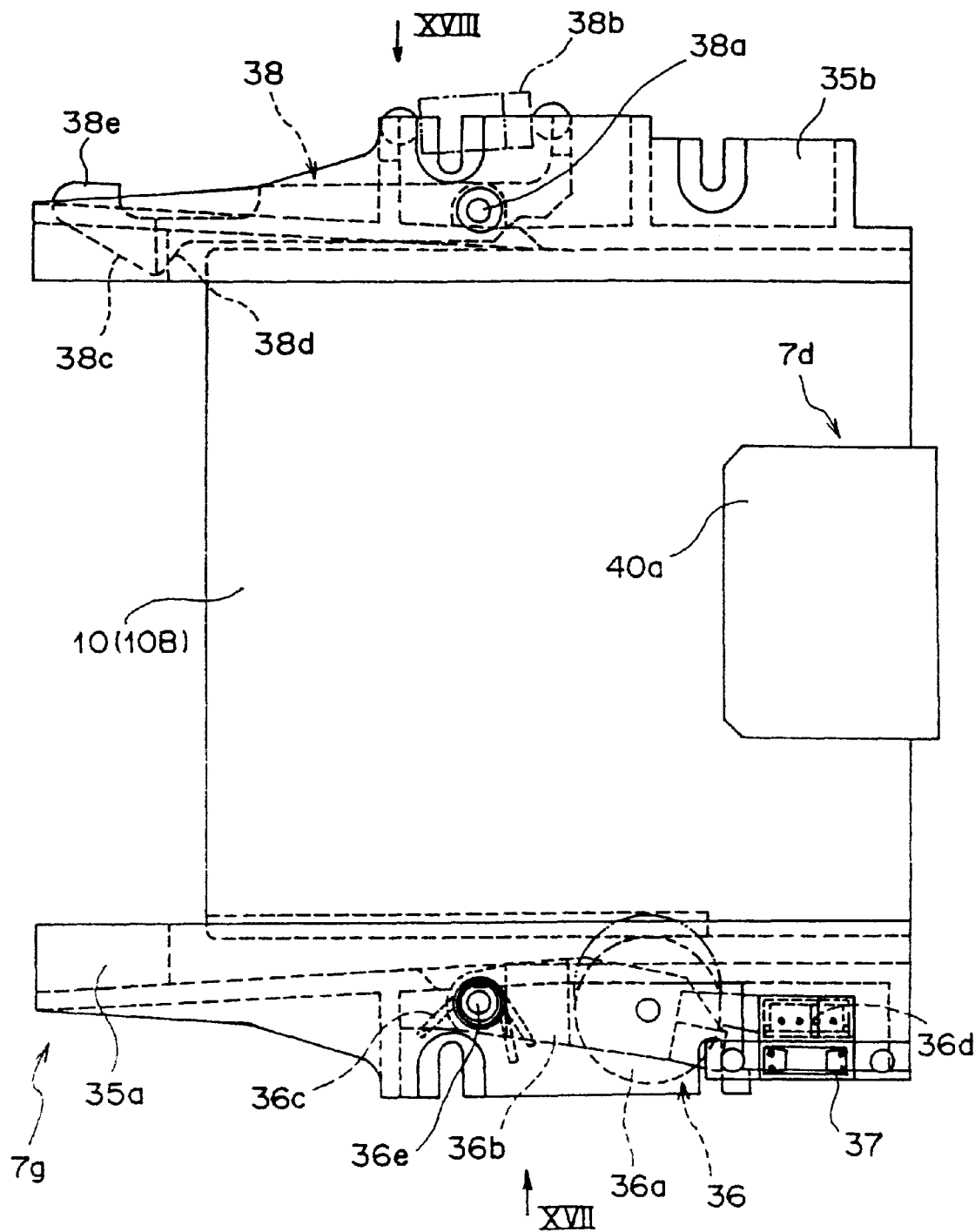
FIG. 1 is a plan view showing only a principal portion of a cartridge transferring robot (accessor) for a library apparatus according to an embodiment of the present invention.
Figure 2:
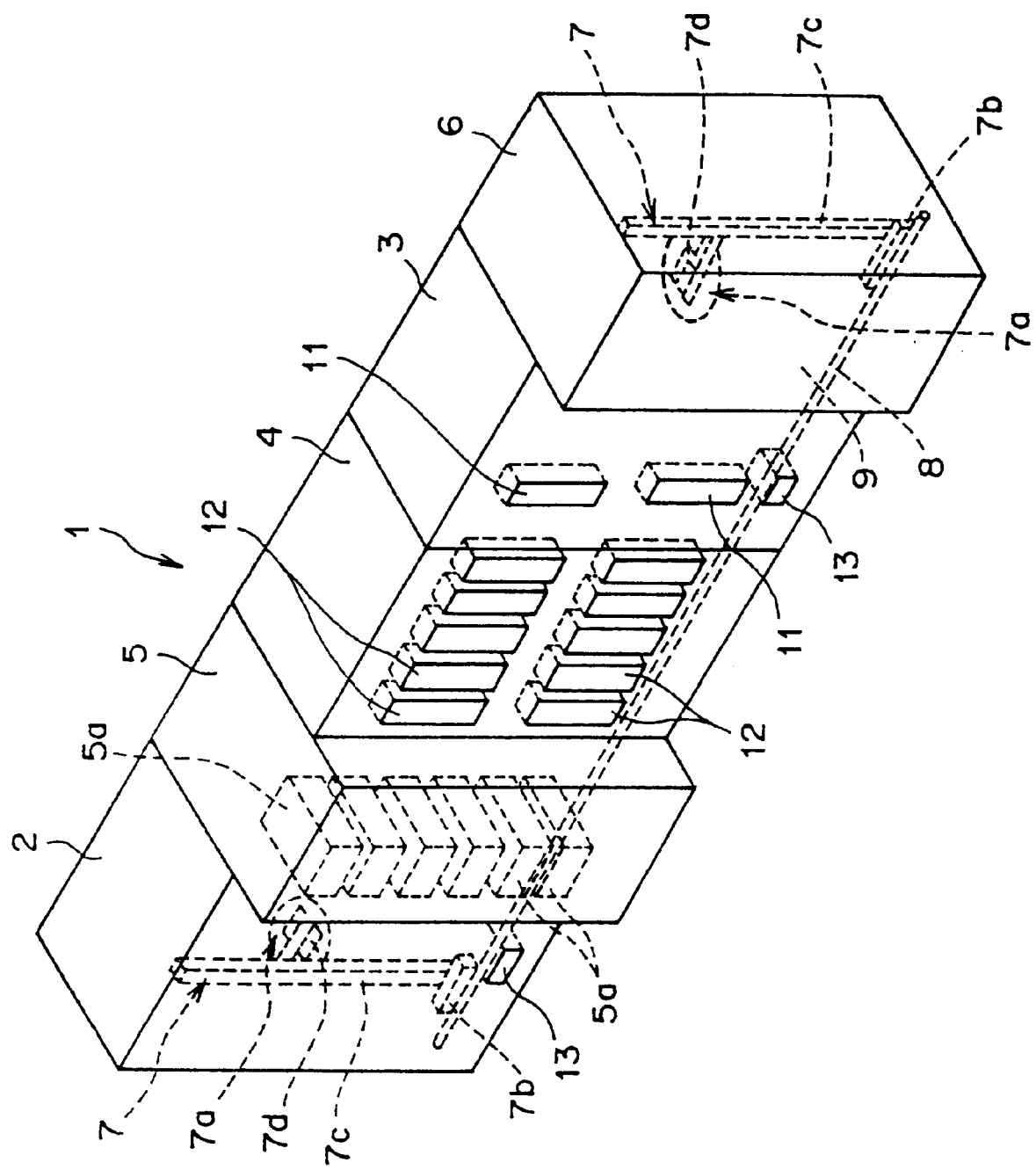
FIG. 2 is a perspective view illustratively showing the whole structure of a library apparatus to which this embodiment is applicable.

FIG. 2 is a perspective view illustratively showing the entire construction of a library apparatus to which this embodiment is applicable. As shown in FIG. 2, a library apparatus 1 to which this embodiment is applicable stores a large number of magnetic tape cartridges 10 (see FIGS. 1, 15, 16 and other illustrations; cartridges each accommodating a magnetic tape as a storage medium) and conducts access such as write/read of recording/recorded data toward each of the magnetic tape cartridge 10.

The library apparatus 1 is composed of, for example, left and right accessor units (which will be referred hereinafter to as LAU, RAU, respectively) 2, 3, a cartridge storage unit (which will be referred hereinafter to as a CSU) 4, a tape drive mount unit (which will be referred hereinafter to as a TMU) 5, and an accessor extend unit (which will be referred hereinafter to as an AEU) 6, which are in a connected relation to each other. Also included in the apparatus 1 are cartridge transferring robots (automatic conveying robot; which will be referred hereinafter to as accessors) 7 which are located on the left and right sides, respectively, and which move within these units 2 to 6 to transfer the cartridge 10.

The LAU 2 and RAU 3 function as garages for the accessors 7, respectively, and on the front side of the RAU 3 (the external space side, that is, the side where the operator operates the apparatus) there are provided a pair of upper and lower cartridge entry/exit stations [each of which will be referred hereinafter to as a CAS (Cartridge Access Station)] 11, 11 for carrying out the entry or exit of the cartridge 10 into or from the library apparatus 1 and a cartridge forced exit station (FES) 13 for forcedly discharging a defective cartridge to the external. In addition, another FES 13 is placed on the front side of LAU 2.

The CSU 4 stores a large number of cartridges 10, and in this embodiment, five cartridge direct entry/exit stations (each of which will be referred hereinafter to as a DEE) 12 are set on the upper side and five DEEs 12 on the lower side, ten in total. In each of the DEEs 12, a magazine (not shown) storing a plurality of cartridges 10 is set in order to permit the simultaneous entry or exit of the plurality of cartridges 10 into or from the library apparatus 1.

Furthermore, a storage unit (not shown) having a large number of cells for storing a large number of cartridges 10 is placed on an inner wall surface of each of the LAU 2, RAU 3 and CSU 4, and the cartridge 10 from the CAS 11 or the DEE 12 is stored in a given cell of the storage unit through the use of the accessor 7.

The TMU 5 has a plurality of (6 in FIG. 2) magnetic tape drive units (drive units; which will be referred hereinafter to as MTUs) 5a, and each of the MTUs 5a conducts the write/read processing of recording/recorded data onto/from a magnetic tape within the cartridge 10 transferred by each of the accessors 7.

The AEU 6 includes a power source (not shown) for supply of an operating power to each of the accessors 7 and a controller (not shown) for control of the accessors 7.

These units 2 to 6 are in a coupled relation to each other and disposed in a state where their rear surfaces (the sides opposite to the above-mentioned front side) are brought into contact with a wall surface or the like, and organize the library apparatus 1. Further, formed in the library apparatus 1 is an operating space (accessor passage) 9 for the accessors 7 which penetrates the units 2 to 6, and placed on the bottom surface of this operating space 9 is a rail (X rail) 8 for guiding the respective accessors 7, which allows each of the accessors 7 to move within the operating space 9.

In addition to a hand mechanism 7d (see FIGS. 6 and 7) for holding the cartridge 10 to perform the insertion/extraction thereof, each of the accessors 7 involves a carriage 7b movable in the horizontal directions along the X rail 8 for moving a hand assembly 7a including this hand mechanism 7d up to a given position and a vertical column 7c for vertically guiding the hand assembly 7a on the carriage 7b, which constitute a moving mechanism. This invention relates to this accessor 7, and a structure and operation thereof will be described later with reference to FIGS. 1 and 3 to 25.

In the library apparatus 1 thus constructed, the cartridge 10 from the CAS 11 or the DEE 12 is picked up and taken out by the hand mechanism 7d of the accessor 7 and is inserted into and stored in a given cell of the storage unit after being carried through the operating space 9 by the accessor 7.

Furthermore, of a large number of cartridges 10 stored in the respective cells of the storage unit, a cartridge(s) 10 specified by a host unit is gripped and pulled out by the hand mechanism 7d of the accessor 7 and then transferred by the accessor 7 through the operating space 9 to the MTU 5a of the TMU 5 to be inserted thereinto.

In the MTU 5a, after the recording/reproduction processing on/from the magnetic tape housed in the cartridge 10, the cartridge 10 is discharged from the MTU 5a and gripped and taken out by the hand mechanism 7d of the accessor 7 and subsequently inserted into and stored in a given cell of the storage unit by the accessor 7 after passing through the operating space 9.

Incidentally, for discharging the cartridge(s) 10 stored in the storage unit to the exterior of the library apparatus 1, the cartridge 10 to be discharged is gripped by the hand mechanism 7d of the accessor 7 to be taken out from the storage unit and then transferred through the operating space 9 to the CAS 11 or the DEE 12 by the accessor 7 to be inserted into a given position (cell) of the CAS 11 or the DEE 12.

[2] Description of Entire Arrangement of Accessor

Figure 3:
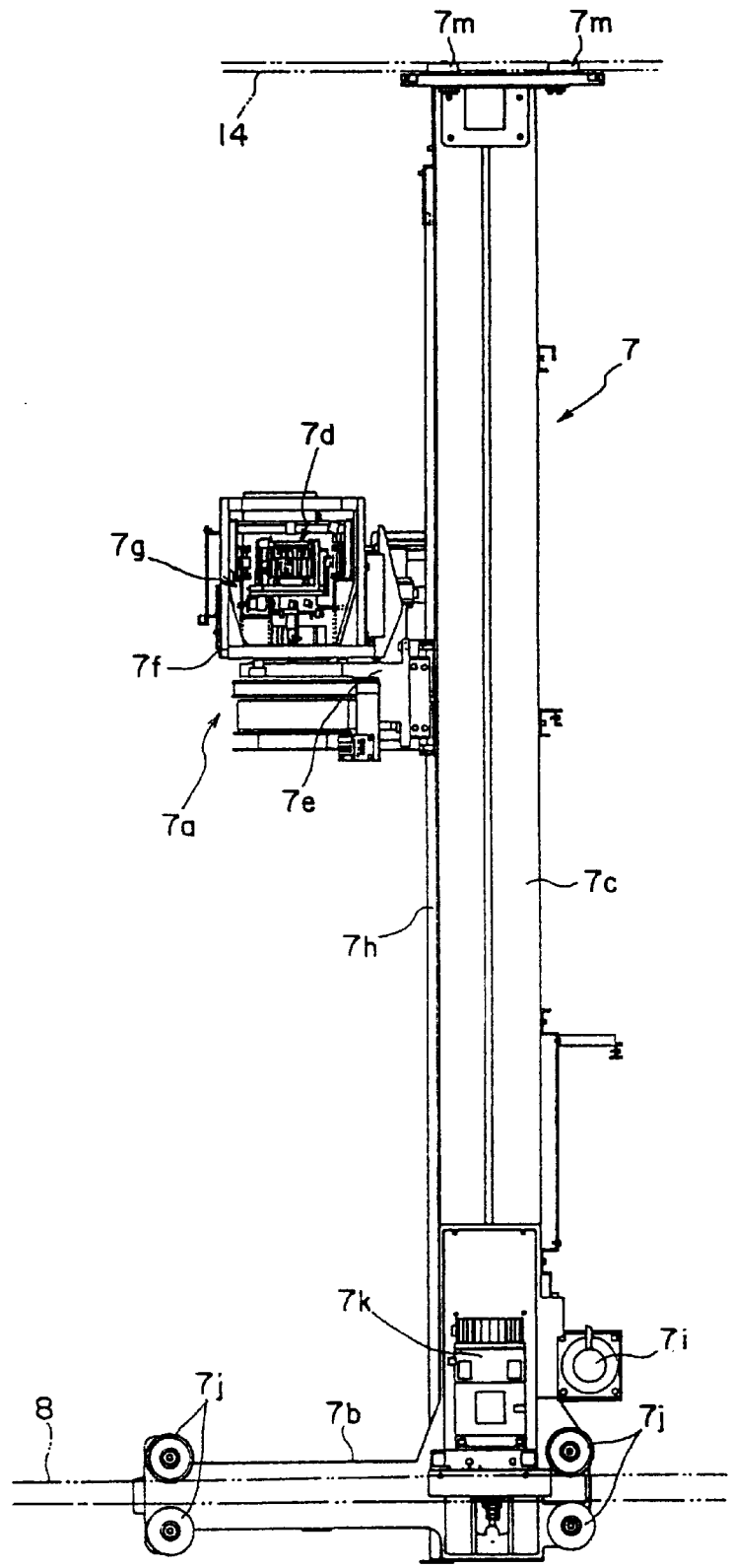
FIG. 3 is a front elevational view showing an accessor according to this embodiment.

FIG. 3 is a front elevational view showing the accessor 7 in this embodiment. As shown in FIG. 3, the accessor 7 is, as mentioned before, composed of the hand assembly 7a including the hand mechanism 7d, the carriage 7b and the vertical column 7c.

The hand assembly 7a is constructed in such a manner as to place a picker section 7g including the hand mechanism 7d on a tilt base 7f on a supporting base 7e. The detailed construction thereof will be described later.

The supporting base 7e making up the hand assembly 7a is attached to the vertical column 7c to be allowed to slide up and down while being guided by a guide rail 7h fixed vertically along the vertical column 7c. In addition, the supporting base 7e is coupled to a belt (not shown; a belt wound around a pair of pulleys built in upper and lower locations of the vertical column 7c). When this belt is rotationally driven by an elevating drive motor 7i, the supporting base 7e, that is, the whole hand assembly 7a, is vertically shifted to be positioned at a given height.

The carriage 7b is integrally connected to a lower end side of the vertical column 7c and is made to travel along the X rail 8 while supporting the vertical column 7c. Onto the front and rear sides of this carriage 7b, there are pivotally fitted two sets (two pairs) of traveling rollers 7j, 7j each set of which are situated to vertically sandwich the X rail 8 therebetween to be rotatable in accordance with the traveling of the carriage 7b.

Furthermore, the X rail 8 is equipped with a traveling drive rack (not shown) made to extend in its longitudinal directions. In addition, the carriage 7b is provided with a pinion (not shown) geared with that rack to be rotationally driven by a traveling drive motor 7k.

Still further, a top rail 14 is laid in an upper section of the operating space 9 of the accessor 7 to extend in parallel to the X rail 8. In addition, on the upper end side of the vertical column 7c, there are pivotally fitted two sets (two pairs) of guide rollers 7m, 7m which are situated on the front and rear sides to horizontally sandwich the top rail 14 therebetween to be rotatable in accordance with the traveling of the carriage 7b.

Thus, when the traveling drive motor 7k rotationally drives the pinion, the accessor 7 is wholly moved along the X rail 8 while the pinion and the traveling drive rack gear with each other. Further, when the elevating drive motor 7i revolves the aforesaid belt, the hand assembly 7a is wholly moved up and down along the vertical column 7c. Consequently, the hand assembly 7a (the picker section 7g including the hand mechanism 7d) is shifted up to a given position within a plane including the X rail 8 and the vertical column 7c and positioned thereat.

[3] Description of Hand Assembly

Figure 4:
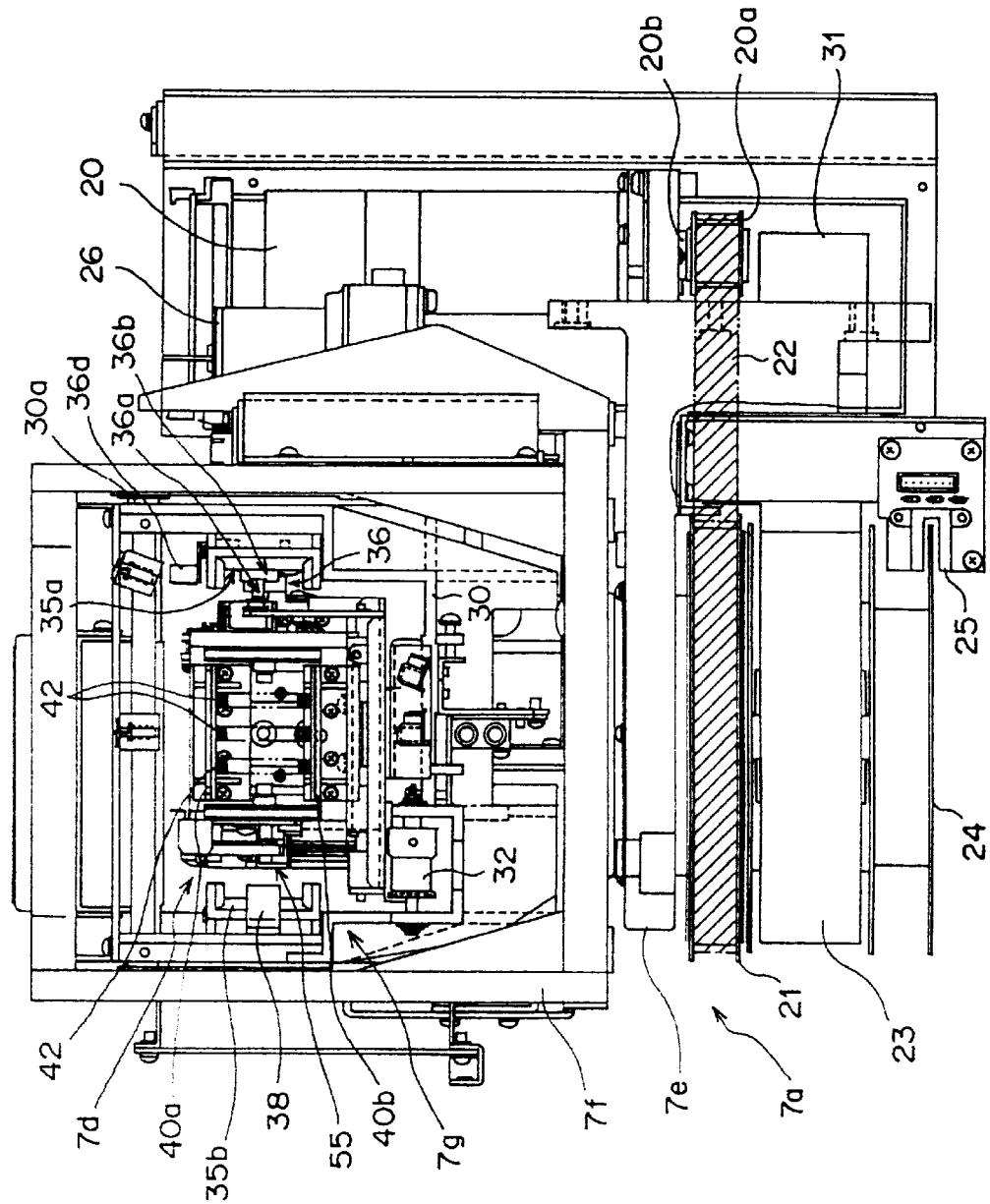
FIG. 4 is a front elevational view showing a hand assembly of the accessor according to this embodiment.
Figure 5:
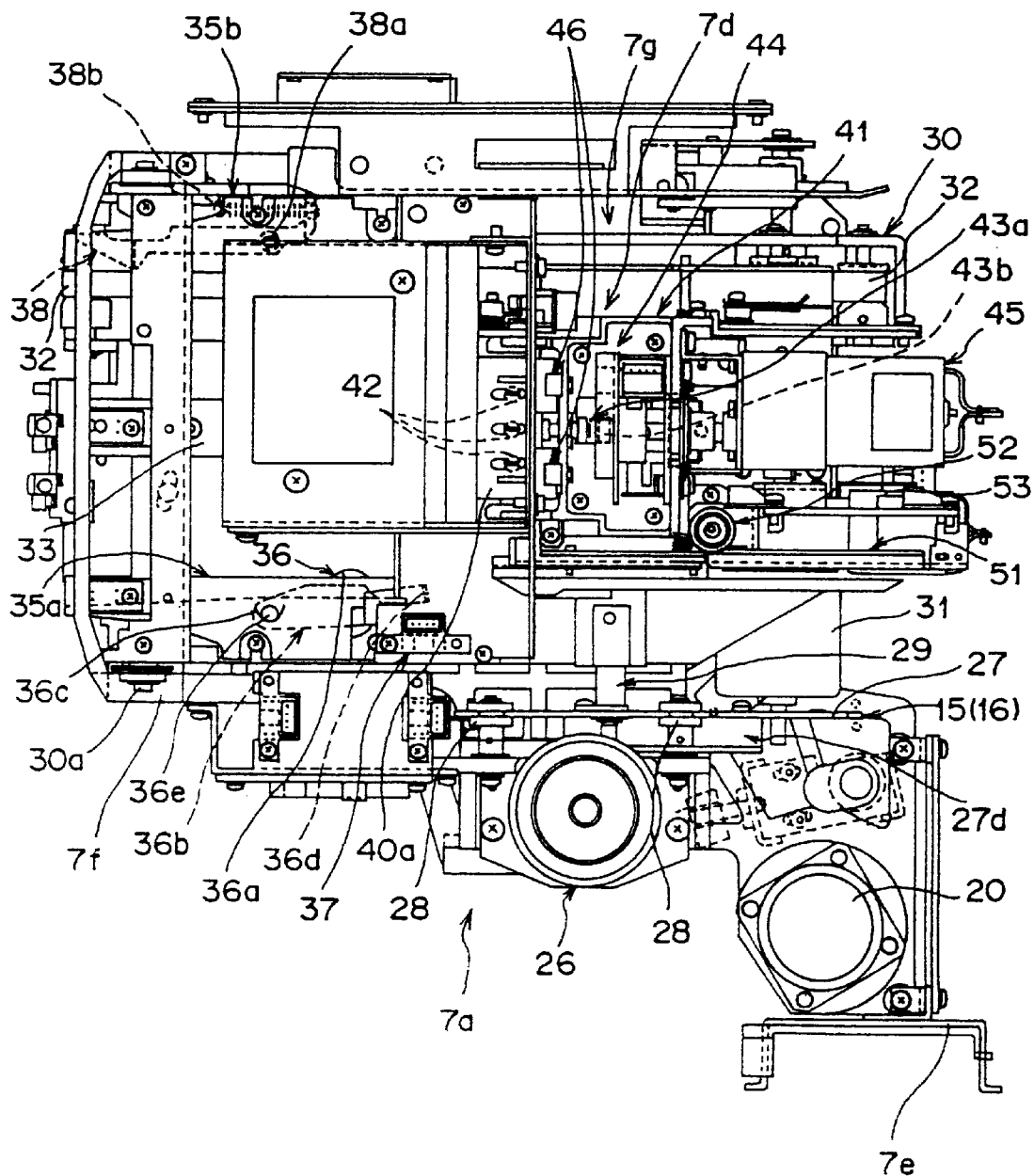
FIG. 5 is a plan view showing the hand assembly of the accessor according to this embodiment.

FIGS. 4 and 5 are front elevational and plan views showing the hand assembly 7a of the accessor 7 in this embodiment. As shown in FIGS. 4 and 5, in that hand assembly 7a, the hand mechanism 7d is mounted on the picker section 7g (a picker base 30) to be movable in the forward and backward directions, and as will be described with reference to FIGS. 12 to 16, the hand mechanism 7d is driven by a servo motor 31 and a timing belt 32 to slide in the forward and backward directions (the left- and right-hand directions in FIG. 5) along an LM guide 33.

The picker section 7g (picker base 30) is swingably fitted to the tilt base 7f and is swingingly driven around a supporting shaft (rotary shaft) 30a through a swinging drive mechanism 16 comprising a tilt motor 26, a plate cam 27 and a guide roller 28 located on the supporting base 7e side and a cam follower 29 situated on the picker section 7g side. A tilt mechanism 15 comprising the aforesaid tilt base 7f and swinging drive mechanism 16 will be described in detail later with reference to FIGS. 8 to 11.

Furthermore, the tilt base 7f is fitted with respect to the supporting base 7e to be revolvable, and driven through a revolving drive motor 20, a pulleys 20a, 21 and a timing belt 22 to revolve around its vertical shaft.

More specifically, the revolving drive motor 20 is fixedly secured to the supporting base 7e side in a state where a driven shaft 20b is disposed vertically, and the pulley 20a fitted over the driven shaft 20b is rotationally driven around its vertical shaft. Further, the tilt base 7f is supported by the supporting base 7e to be revolvable around its vertical shaft, and the pulley 21 is fitted to the tilt base 7f to be coaxial with its revolving shaft. In addition, the timing belt 22 is wound around the pulleys 20a and 21.

Accordingly, in a manner that the revolving drive motor 20 rotationally drives the pulley 20a, the rotational drive force of the motor 20 is transmitted through the timing belt 22 and the pulley 21 to the tilt base 7f which in turn, is driven to be revolved around its vertical shaft together with the picker section 7g and the hand mechanism 7d.

Moreover, provided below the pulley 21 is a cable casing 23, and further fitted below it is a disc 24 with a slit for rotational position detection which rotates integrally with the pulley 21 and the tilt base 7f.

In the cable casing 23, a cable (not shown) for transmission and reception of various signals and a power supply between the supporting base 7e side and the tilt base 7f side is put spirally with respect to its revolving shaft to be revolvable therein.

The disc 24 with the slit is disposed to pass through the position of a photosensor 25 fixed on the supporting base 7e side, so that the photosensor 25 can detect the slit (not shown) of the disc 24, which allows the detection of the revolved position of the tilt base 7f, i.e., the direction of the picker section 7g (hand mechanism 7d).

As shown in FIGS. 4 and 5, in addition to the aforesaid picker base 30, servo motor 31, timing belt 32 and LM guide 33, the picker section 7g is equipped with a cartridge discrimination actuator 36 comprising a pair of left- and right-hand guide members 35a, 35b, a roller 36a, an arm 36b, a coil spring 36c, a flag 36d and a rotary shaft 36e, and further provided with a photosensor 37, and a claw (locking member) 38 swingable around a rotary shaft 38a and biased by a spring 38b. This picker section 7g includes an arrangement being the feature of this invention, and the detailed description thereof will be made later with reference to FIGS. 1 and 12 to 25.

In addition, as shown in FIGS. 4 and 5, the hand mechanism 7d is provided with a mounter mechanism 50 comprising a pair of upper and lower hand members 40a, 40b, a hand base 41, springs 42, a pair of upper and lower cam followers 43a, 43b, a cam 44, a hand opening and closing drive motor (rotating drive mechanism) 45, linear ways 46, a mounter arm 51 with a rack 51a, a pinion 52 and a mounter arm drive motor 53, and further equipped with a CIP/CSP unit 55. These portions will be described later in detail with reference to FIGS. 6 and 7.

[4] Description of Hand Mechanism

Figure 6:
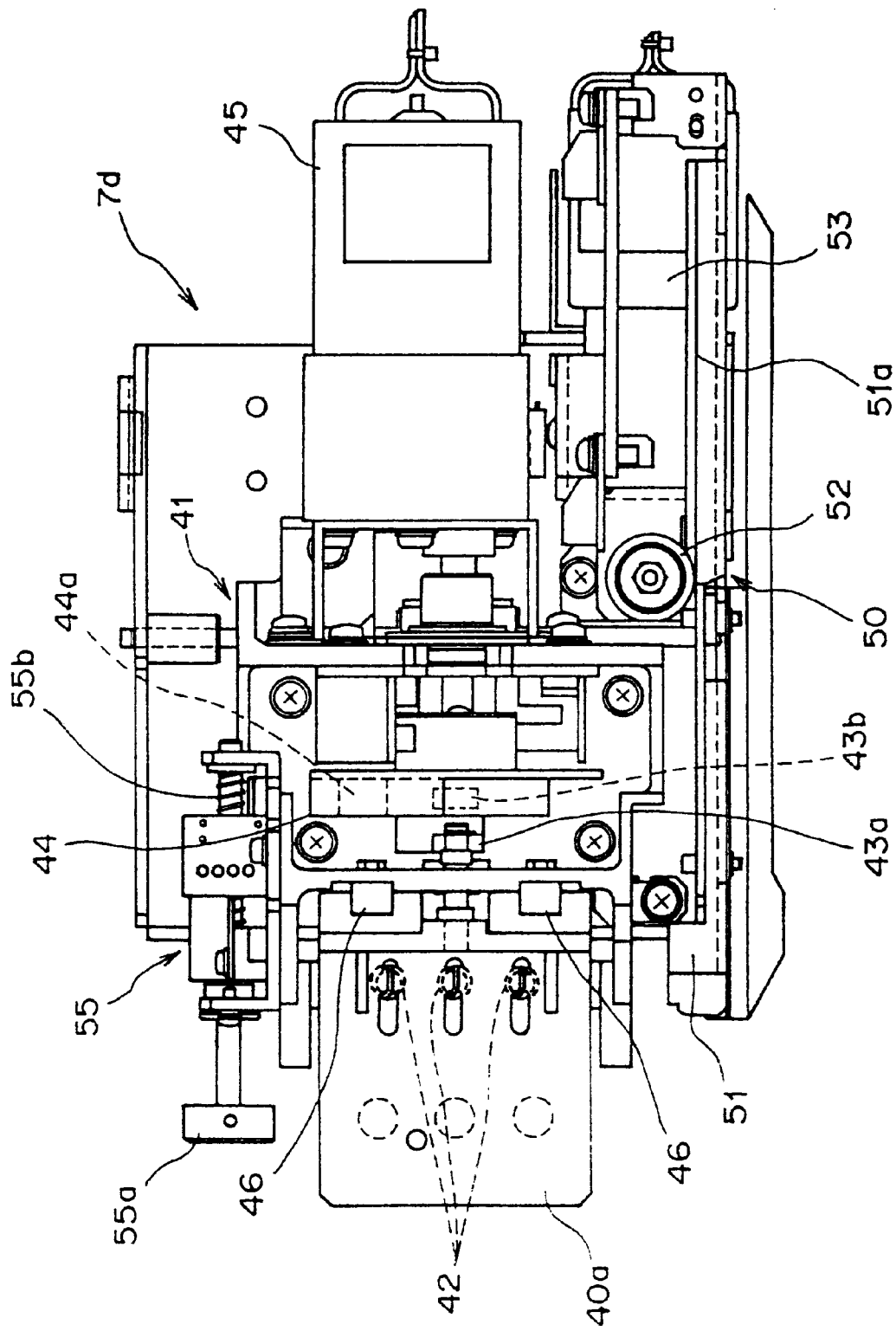
FIG. 6 is a plan view showing a hand mechanism of the accessor according to this embodiment.
Figure 7:
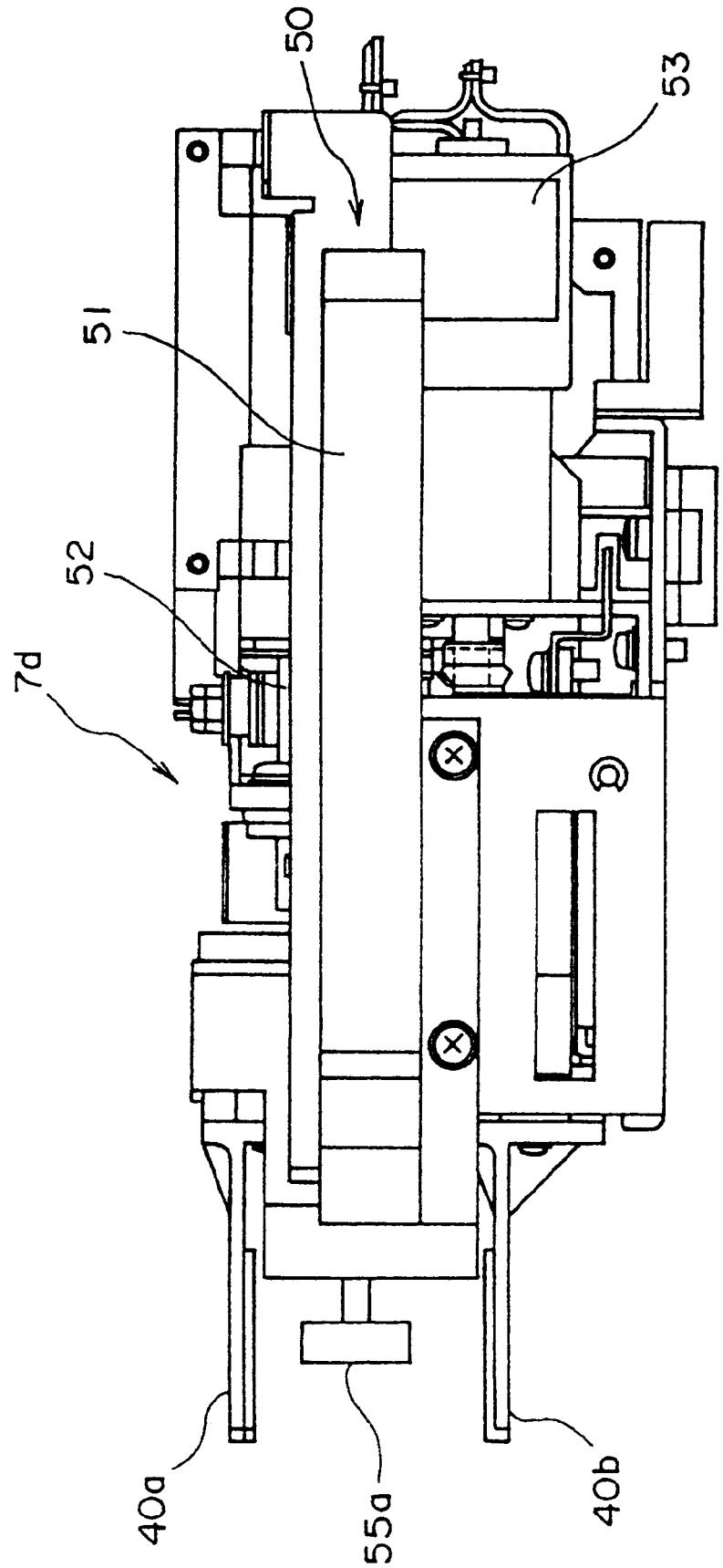
FIG. 7 is a side elevational view showing the hand mechanism of the accessor according to this embodiment.

FIGS. 6 and 7 are respectively plan and side elevational views showing the hand mechanism 7d of the accessor 7 in this embodiment. As shown in FIGS. 6 and 7, this hand mechanism 7d is, as mentioned before, provided with the pair of upper and lower hand members 40a, 40b, the hand base 41, the spring 42, the pair of upper and lower cam followers 43a, 43b, the cam 44, the hand opening and closing drive motor 45, the pair of linear ways 46, the mounter mechanism 50 and the CIP/CSP unit 55. In these illustrations, the reference numerals being the same as those taken in the above description denote the same or substantially same parts.

The pair of upper and lower hand members 40a, 40b come into contact with the cartridge 10 from the above and below to grip the cartridge 10, and are fitted onto the hand base 41 to be allowed to slide vertically through the pair of left- and right-hand leaner ways 46, 46. Interposed between the hand members 40a, 40b is the springs 42 which biases the hand members 40a, 40b in the closing directions of gripping the cartridge 10.

Furthermore, the cam followers 43a, 43b are fitted to the hand members 40a, 40b, respectively, and the cam 44 is placed between the pair of upper and lower cam followers 43a, 43b. This cam 44 is made to have a large-diameter portion for pressing the pair of upper and lower cam followers 43a, 43b against the biasing force of the spring 42 to enlarge the separation therebetween to make the upper and lower hand members 40a, 40b come into the open condition, and to have a small-diameter portion for making a separation from the cam followers 43a, 43b, and further to have a lock groove 44a which will be described below.

The lock groove 44a functions as a locking mechanism to fix the pair of upper and lower hand members 40a, 40b to the hand base 41 in a state where the cartridge 10 is gripped between the hand members 40a, 40b. In a manner of holding the lower cam follower 43b, the hand members 40a, 40b are fixed to the hand base 41 in a state of gripping the cartridge 10.

In addition, the hand opening and closing drive motor 45 rotationally drives the cam 44 so that the cam 44 takes one of a hand open position to make the large-diameter portion stand between the cam followers 43a, 43b, a cartridge gripping position to make the small-diameter portion exist between the cam followers 43a, 43b, and a lock position to make the lock groove 44a fix the hand members 40a, 40b to the hand base 41 in a state of gripping the cartridge 10.

Still further, the hand mechanism 7d is provided with the mounter mechanism 50 for applying a pressing force to the cartridge 10 to insert the cartridge 10 into the MTU 5a. In the embodiment, the mounter mechanism 50 is composed of the mounter arm 51, the pinion 52 and the mounter arm drive motor 53.

In this construction, the mounter arm 51 is placed to be movable in the direction of coming into contact with the rear end surface of the cartridge 10 gripped by the hand mechanism 7d to push it into the MTU 5a. The pinion 52 is made to engage with the rack 51a formed on the mounter arm 51, and is rotationally driven by the motor 53 to shift the mounter arm 51 in the cartridge pushing-in direction.

In addition, the mounter mechanism 50 is equipped with a buffer mechanism (not shown) for absorbing the excessive pressing force in the case that a pushing force exceeding a given load works on the cartridge 10. This buffer mechanism is, for example, constructed by putting a resin bearing or a resin spacer between the pinion 52 and a drive shaft (not shown) of the motor 53.

On the other hand, the hand mechanism 7d incorporates the CIP/CSP unit 55 which in turn, comprises a CIP (Cartridge In Picker, a first sensor; not shown) for detecting the fact that the cartridge 10 is put between the hand members 40a, 40b and a CSP (Cartridge Secured Position, a second sensor; not shown) for sensing the fact that the rear end surface of the cartridge 10 reaches a given position after the detection of the insertion of the cartridge 10 by the CIP.

These CIP and CSP are composed of photosensors, respectively, and undergo the light-interception due to a flag (not shown) driven by an actuator 55a, thereby detecting the insertion of the cartridge 10 and the certainly held condition of the cartridge 10. The actuator 55a is pressed by a spring 55b in the forward direction (left-hand direction in FIG. 6), and when the cartridge 10 comes in between the hand members 40a, 40b, the actuator 55a comes into contact with the rear end surface of the cartridge 10 (see FIGS. 15 and 16) to be pressed against the biasing force of the spring 55b, thus driving the flag to successively operate the CIP and the CSP.

In this embodiment, since the hand mechanism 7d of the accessor 7 has the mounter mechanism 50 and the CIP/CSP unit 55 in addition to being constructed as described above, the following effects are obtainable.

When the cam 44 is driven by the motor 45 to take the hand open position, the large-diameter portion of the cam 44 presses the cam followers 43a, 43b to enlarge the separation therebetween, thus opening the hand members 40a, 40b. When gripping the cartridge 10 by the hand mechanism 7d, the cartridge 10 is put between the hand members 40a, 40b taking the open condition and, subsequently, the cam 44 is driven by the motor 45 to assume the cartridge gripping position, so that the hand members 40a, 40b come into contact with the cartridge 10 from the above and below in response to the biasing force of the spring 42, thus gripping the cartridge 10.

At this time, since the gap is defined between the small-diameter portion of the cam 44 and the cam followers 43a, 43b, the hand members 40a, 40b are movable vertically by a quantity corresponding to this gap (looseness) in a state of gripping the cartridge 10.

Accordingly, even if a difference in position between the cartridge insertion opening of the MTU 5a and the cartridge 10 gripped by the hand mechanism 7d slightly occurs, the positional difference can be absorbed by the vertical movements corresponding to the aforesaid gap, and by making the most of that gap as a buffer, the certain insertion of the cartridge 10 into the MTU 5a becomes possible.

Furthermore, when the cam 44 is driven by the motor 45 to come to the lock position, the cam follower 43b is held in the lock groove 44a of the cam 44, and the hand members 40a, 40b are fixed to the hand base 41 in a state of gripping the cartridge 10.

For instance, for extracting the cartridge 10 from the storage unit, at the time that a locking member locking the cartridge 10 in the storage unit is disconnected from the cartridge 10, it is necessary to slightly lift the cartridge 10 in a state of being gripped by the hand members 40a, 40b. In this case, in this embodiment, as mentioned above, the hand members 40a, 40b are fixed to the hand base 41 through the lock mechanism (the lock groove 44a of the cam 44) while gripping the cartridge 10, with the result that it is possible to stop the vertical movements of the hand members 40a, 40b due to the looseness, and hence to surely lift the cartridge 10.

Still further, when the cartridge 10 is inserted into the MTU 5a, the cartridge 10 is conveyed through the hand mechanism 7d up to the cartridge insertion opening of the MTU 5a and the hand members 40a, 40b are opened there, and subsequently, the pinion 52 is rotationally driven by the motor 53 so that the mounter arm 51 is shifted in the cartridge pushing-in direction by the pinion 52 and the rack 51a gearing with this pinion 52. Whereupon, the cartridge 10 is inserted into the depth of the MTU 5a while being pressed by the mounter arm 51, which makes sure the insertion of the cartridge 10 into the depth of the MTU 5a.

At this time, in this embodiment, when a pressing force exceeding a given load works on the cartridge 10, the extra pressing force is absorbable by the buffer mechanism provided between the pinion 52 and the drive shaft on the motor 53 side. In this buffer mechanism, a slip occurs through the resin bearing or the resin spacer between the pinion 52 and the drive shaft on the motor 53 side, and a frictional force produced at that time absorbs the extra pressing force, thereby preventing an excessive pressing force from working on the cartridge 10. Accordingly, even if an excessively large load occurs on the cartridge 10, it is possible to protect the cartridge 10 and its peripheral portions and further the mounter mechanism 50 and its drive system (the motor 53 and others) therefrom.

In addition, in a state where the detection result of the CIP (first sensor) shows that the cartridge 10 exists between the hand members 40a, 40b, the CSP (second sensor) can sensitively detect the fact that the rear end surface of the cartridge 10 arrives at a given position, so that the hand mechanism 7d can certainly grip the cartridge 10 discharged from the MTU 5a.

Owing to the hand mechanism 7d having multifuction as mentioned above, without the use of the cartridge giving and receiving mechanism (feeder), the direct insertion and extraction of the cartridge 10 becomes possible between the MTU 5a and the hand mechanism 7d, which can realize the size reduction and lower manufacturing cost of the library apparatus 1.

[5] Description of Tilt Mechanism

Even in the embodiment, since the angles of insertion/ discharge of the cartridge 10 are different from each other among units, it is necessary to change the cartridge inserting/ extracting angle of the hand mechanism 7d.

As the cartridge insertion and extraction directions (angles) of the hand mechanism 7d in the embodiment, there are taken a horizontal direction (0°) and a direction looking downward by a given angle with respect to the horizontal direction. In the case of the MTU 5a, in general the cartridge 10 is inserted and pulled out in/from the horizontal direction (0°). On the other hand, in the case of the storage unit or the like, the cartridge 10 is stored in a condition looking (inclined) downward (for example, by 12°) relative to the horizontal direction to prevent them from dropping from the cells of the storage unit due to the vibrations caused by earthquakes and others, and therefore, the insertion and extraction of the cartridge 10 is made at that angle.

For this reason, an accessor 7 according to this embodiment is, as shown in FIGS. 8 to 11, provided with a tilt mechanism 15 for adjusting the angle of the cartridge inserting/extracting directions with respect to a horizontal plane.

Figure 8A:
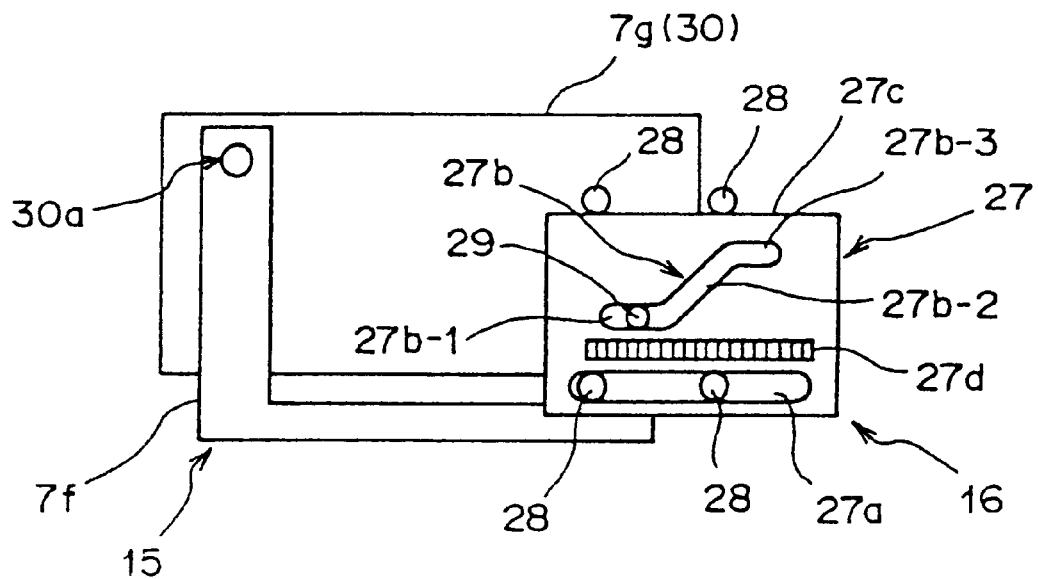
FIGS. 8A and 8B are side elevational views illustratively showing a tilt mechanism of the accessor according to this embodiment.
Figure 8B:
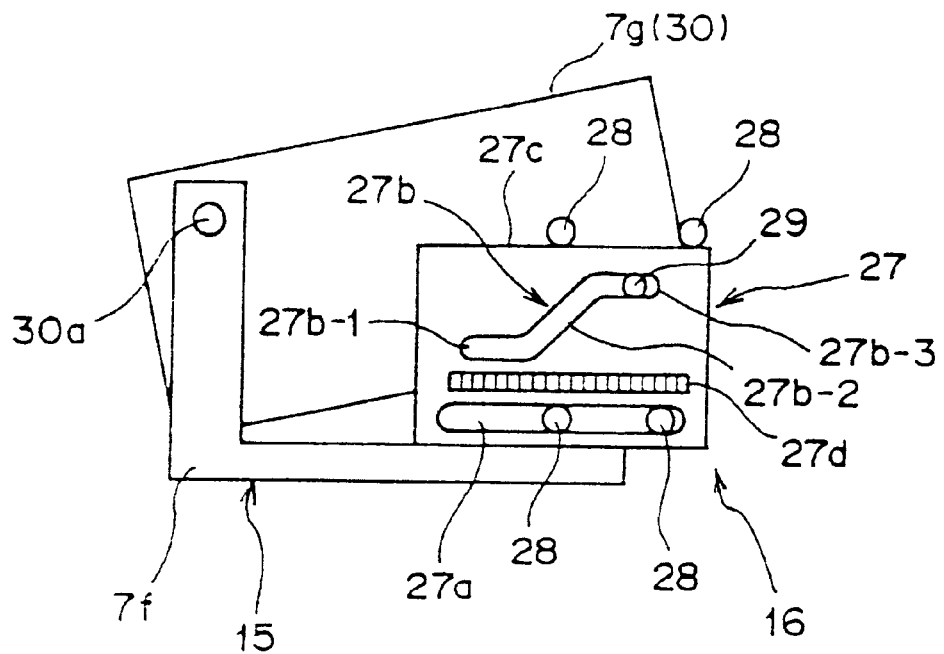
Figure 9:
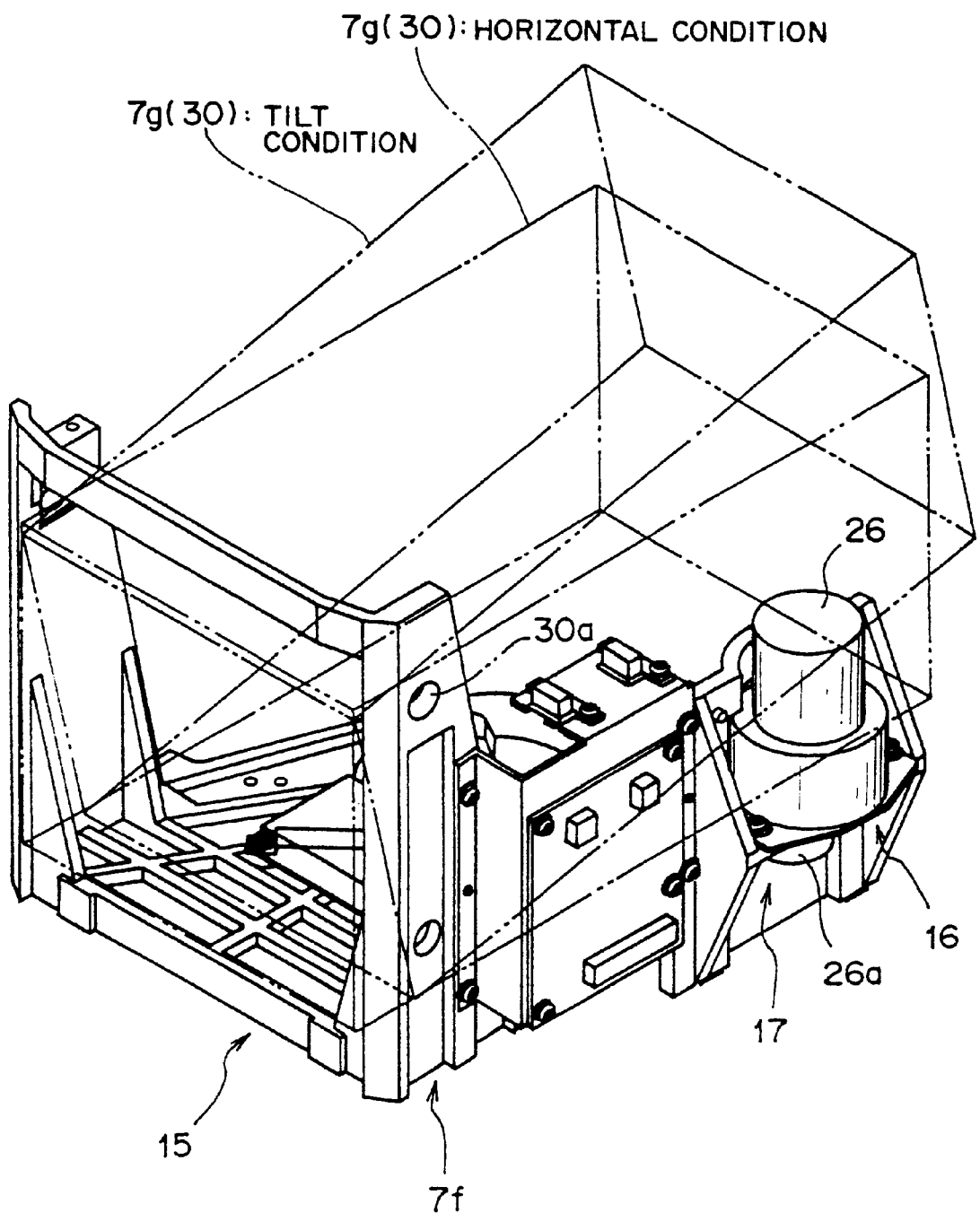
FIGS. 9 and 10 are perspective views showing a principal portion (tilt base) of the tilt mechanism of the accessor according to this embodiment.
Figure 10:
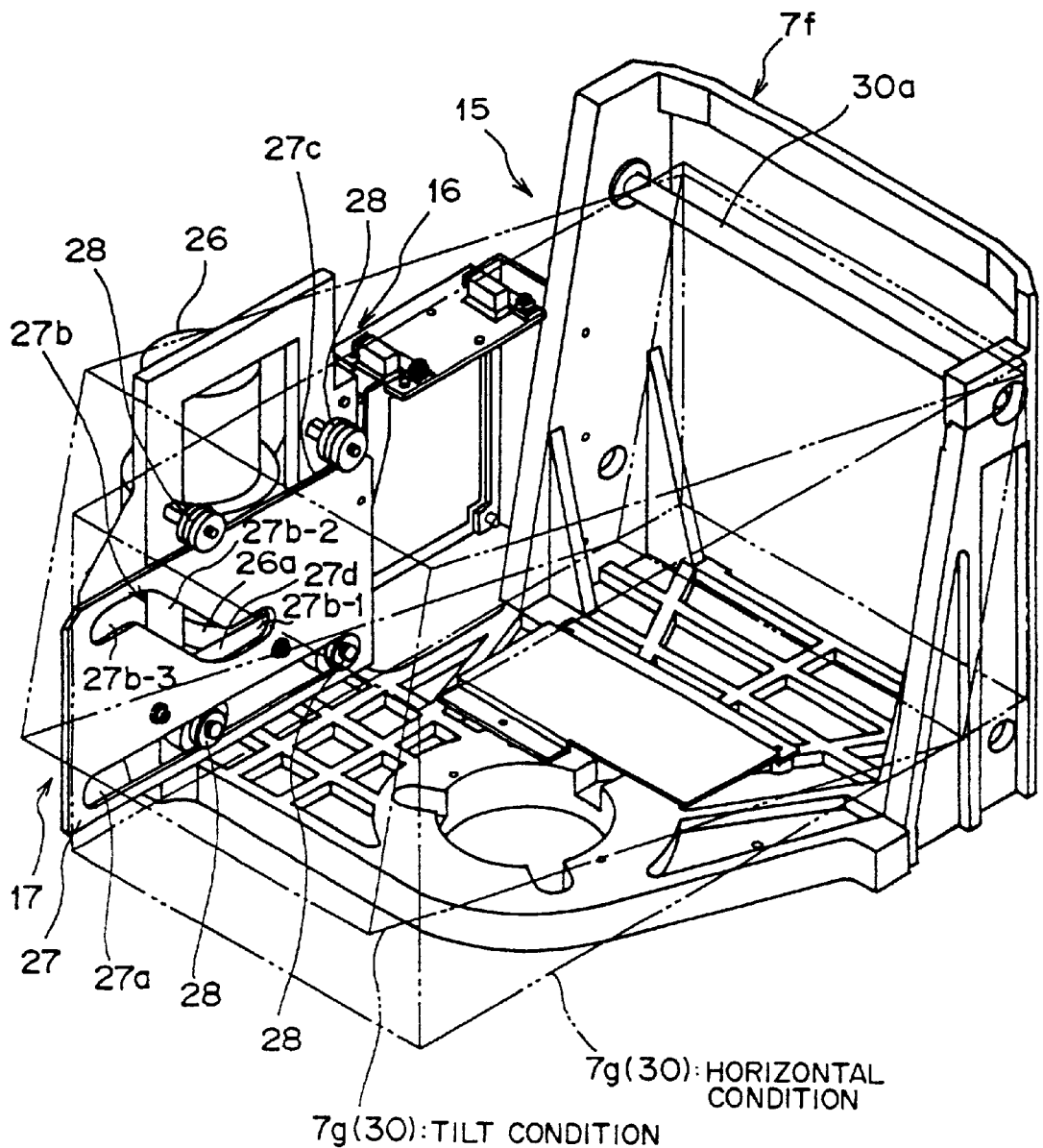
Figure 11:
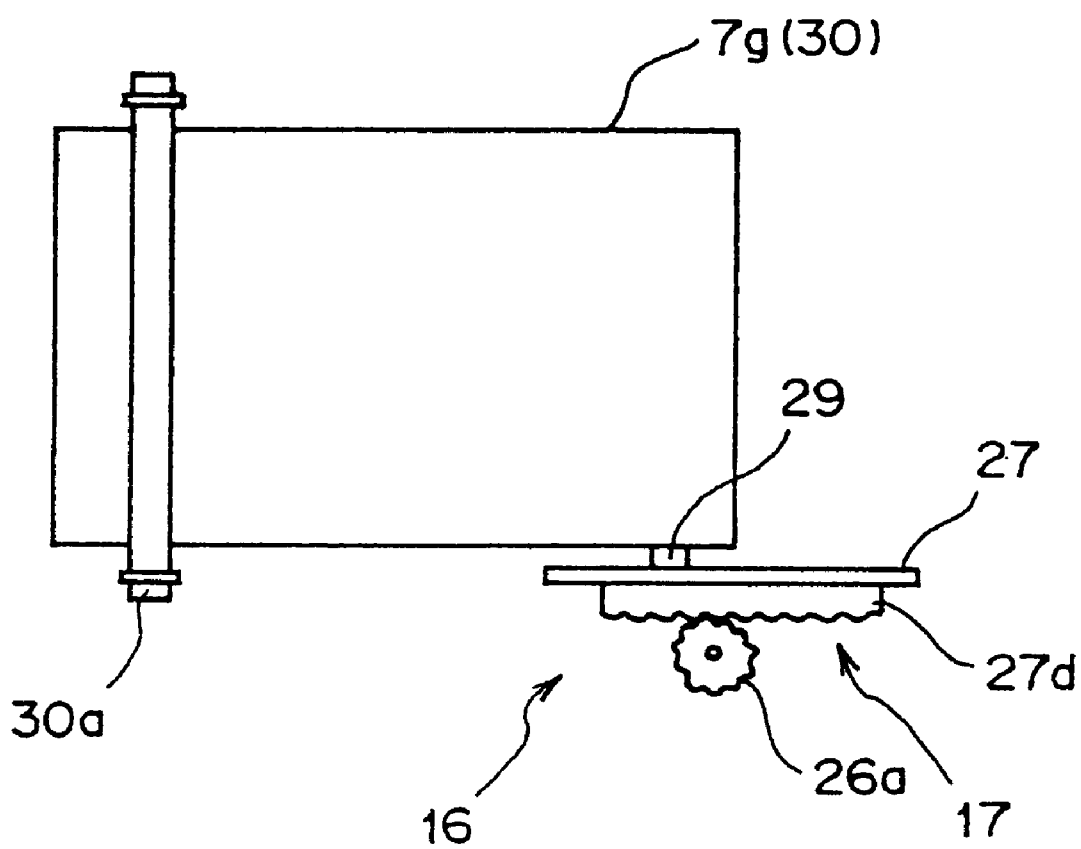
FIG. 11 is a plan view illustratively showing the tilt mechanism of the accessor according to this embodiment.

FIGS. 8A and 8B are side elevational views illustratively showing the tilt mechanism 15 of the accessor 7 according to the embodiment of this invention, and of these drawings, FIG. 8A shows a state where a picker section 7g is disposed in horizontal directions while FIG. 8B illustrates a case in which the picker section 7g is in a tilt condition (a condition looking downward by 12° from the horizontal direction). Further, FIGS. 9 to 11 also show the tilt mechanism 15 of the accessor 7 according to this embodiment, and in more detail, FIGS. 9 and 10 are perspective views showing a principal portion (tilt base 7f) of the tilt mechanism 15, and FIG. 11 is an illustrative plan view thereof. In these illustrations, the reference numerals being the same as those used in the above description depict the same or substantially same parts, and the detailed description thereof will be omitted for brevity.

As shown in FIGS. 8A, 8B, 9 and 10, the picker section 7g (picker base 30) is fitted to a tilt base 7f to be swingable around a supporting shaft (rotary shaft) 30a, and is swingingly driven around the supporting shaft 30a through the use of a swinging drive mechanism 16 comprising a tilt motor 26, a plate cam 27 and a guide roller 28 placed on the side of a supporting base 7e and a cam follower 29 located on the picker section 7g side.

That is, the tilt mechanism 15 according to this embodiment is composed of the tilt base 7f and the swinging drive mechanism 16, and the picker section 7g is supported by the tilt base 7f to be swingable around the supporting shaft 30a placed at an upper portion of the picker section front surface side (the left side in FIGS. 8A, 8B and 11) facing the inserting and extracting place for the cartridge 10. Further, the swinging drive mechanism 16 is disposed on a lower side surface of the rear side (the right side in FIGS. 8A, 8B and 11) of the picker section 7g.

In addition, the swinging drive mechanism 16 is made up of a cam follower 29 protrusively fitted onto a rear surface of the picker section 7g, a plate cam 27 located to be movable in the cartridge inserting/extracting direction with respect to the tilt base 7f for guiding the cam follower 29 in vertical directions in accordance with its forward and backward movements, and a drive mechanism 17 for moving the plate cam 27 in the cartridge inserting/extracting direction with respect to the tilt base 7f.

As shown in FIGS. 8A, 8B and 10, on the tilt base 7f side, two sets (pairs) of upper and lower guide rollers 28, 28 for supporting the plate cam 27 are pivotally fitted onto a rear side surface of the picker section 7g on the front and rear sides, respectively.

The plate cam 27 has an elongated guide hole 27a made to extend in the forward and backward directions, and this elongated guide hole 27a engages with the pair of lower guide rollers 28, 28 pivotally fitted onto the tilt base 7f side. In addition, the pair of upper guide rollers 28, 28 pivotally fitted onto the tilt base 7f side are brought into contact with a horizontal upper edge portion 27c of the plate cam 27 from the above. Whereupon, the plate cam 27 is attached to the tilt base 7f to be movable in the cartridge inserting/extracting direction (forward and backward directions) while being guided by the guide rollers 28.

Furthermore, as shown in FIGS. 8A, 8B, 10 and 11, a rack 27d is formed on the plate cam 27, and is engaged with a pinion 26a fitted over a drive shaft (not shown) of the tilt motor 26 as shown in FIGS. 10 and 11. In FIG. 11, the tilt motor 26 is omitted from the illustration.

Accordingly, when the pinion 26a is rotationally driven by the tilt motor 26, this rotational movement is converted into linear movements of the plate cam 27 through the rack 27d gearing with the pinion 26a, so that the plate cam 27 is driven to reciprocate in the cartridge inserting/extracting direction (in the forward/backward directions). That is, the tilt motor 26, the pinion 26a and the rack 27d organize the drive mechanism 17.

In addition, the plate cam 27 has an elongated swinging drive hole 27b to be made to engage with the cam follower 29. This elongated swinging drive hole 27b has two horizontal portions 27b-1, 27b-3 different in height from each other and an inclined portion 27b-2 making the connection between these horizontal portions 27b-1, 27b-3.

The front side horizontal portion 27b-1 is for maintaining the picker section 7g in the horizontal condition. As shown in FIG. 8A, in a state where the cam follower 29 is positioned at the horizontal portion 27b-1 of the elongated hole 27b, the picker section 7g is disposed horizontally, with the result that the cartridge inserting/extracting directions of the hand mechanism 7d is maintained to be the horizontal direction.

On the other hand, the rear side horizontal portion 27b-3 is formed at a position higher than the front side horizontal portion 27b-1, and is for maintaining the picker section 7g in the tilt condition in which the front surface of the picker section 7g is inclined downwardly by a given angle (for example, 12°) with respect to the horizontal direction. If the plate cam 27 is shifted from the FIG. 8A state in the front direction (in the left-hand direction in FIG. 8A) so that the cam follower 29 moves from the horizontal portion 27b-1 through the inclined portion 27b-2 to the horizontal portion 27b-3 while being guided, as shown in FIG. 8B, the picker section 7g swings around the supporting shaft 30a to get into the tilt condition, with the result that the cartridge inserting/extracting direction of the hand mechanism 7d is taken to be the direction looking downward by a given angle (for example, 12°) with respect to the horizontal direction.

In the tilt mechanism 15 of the accessor 7 according to the first embodiment thus constructed, the picker section 7g is swingingly driven around the supporting shaft 30a, placed on the picker section front surface side, through the swinging drive mechanism 16 disposed on the rear side of the picker section 7g, so that the cartridge inserting/extracting direction is adjustable with respect to a horizontal plane.

More specifically, since the supporting point (i.e., the position of the supporting shaft 30a) on the tilt action is located on the front side of the picker section 7g while the effort point (the driven position by the swinging drive mechanism 16, i.e., the position of the cam follower 29) is situated on the rear side of the picker section 7g, the distance $L_1$ from the supporting point (supporting shaft 30a) to the effort point (cam follower 29) can be set to be sufficiently longer than the distance $L_2$ from the supporting point to the tip position of the hand mechanism 7d (hand members 40a, 40b).

Accordingly, in the case of the tilt mechanism 15 according to this embodiment, $L_2/L_1$ can be set to below 1, and the dimensional error dy at the effort point (cam follower 29) can be prevented from being enlarged and amplified at the tip position of the hand mechanism 7d.

As described above, in the case of the tilt mechanism 15 according to this embodiment, with only the change of the positional relationship between the supporting point and the effort point on the tilt action, it is possible to sharply improve the accuracy of the cartridge inserting/extracting direction of the hand mechanism 7d, and further to ensure the positional accuracy of the tip portion of the hand mechanism 7d which is sufficient for the direct insertion and extraction of the cartridge 10 into/from the MTU 5a. Thus, without installing the cartridge giving and receiving mechanism at every MTU 5a, the direct insertion and extraction of the cartridge 10 into/from each of the MTUs 5a through the hand mechanism 7d becomes possible, which contributes to the size reduction and lower manufacturing cost of the library apparatus 1.

[6] Description of Picker Section

Figure 12:
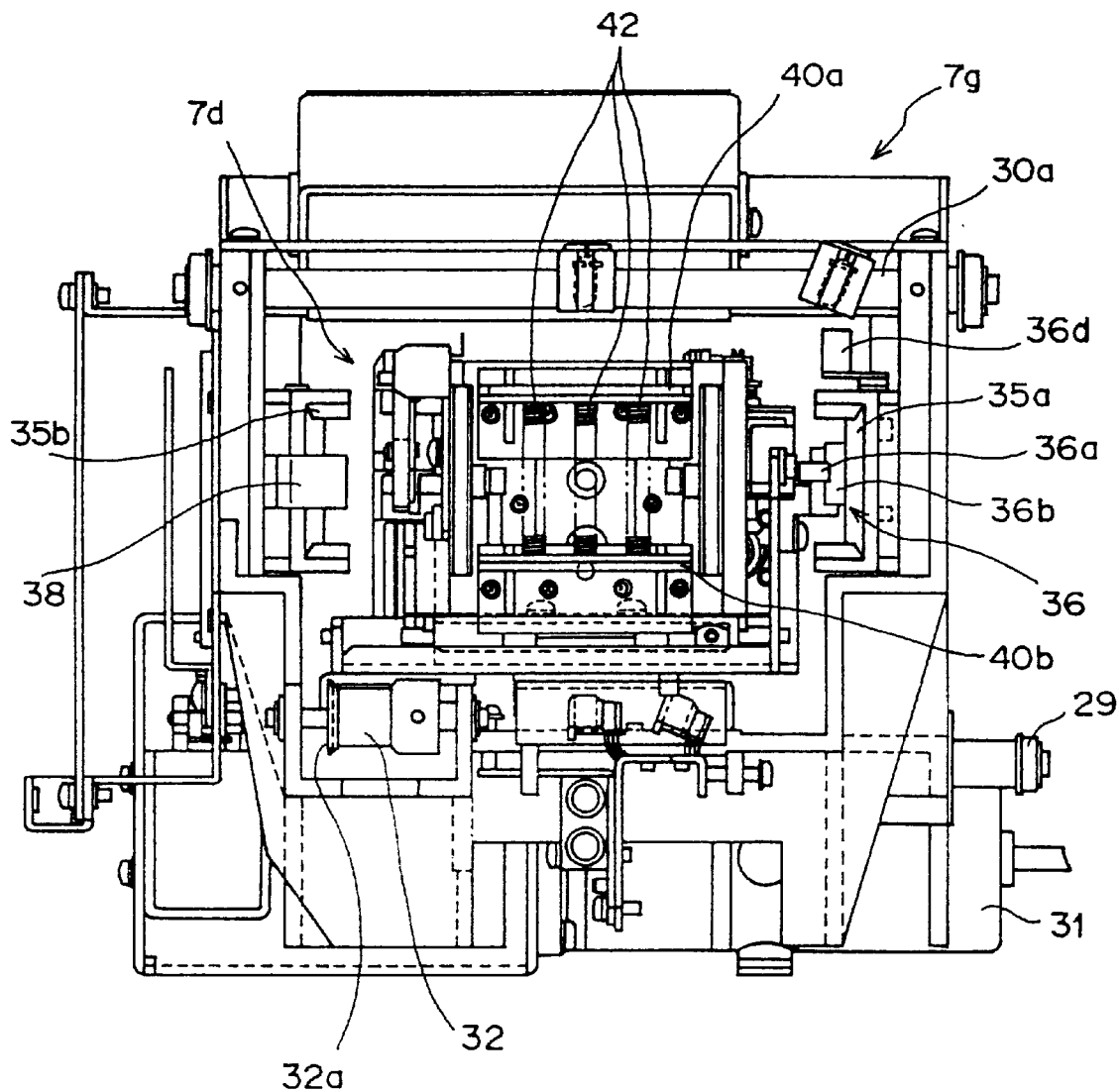
FIG. 12 is a front elevational view showing the picker section of the accessor according to this embodiment.
Figure 13:
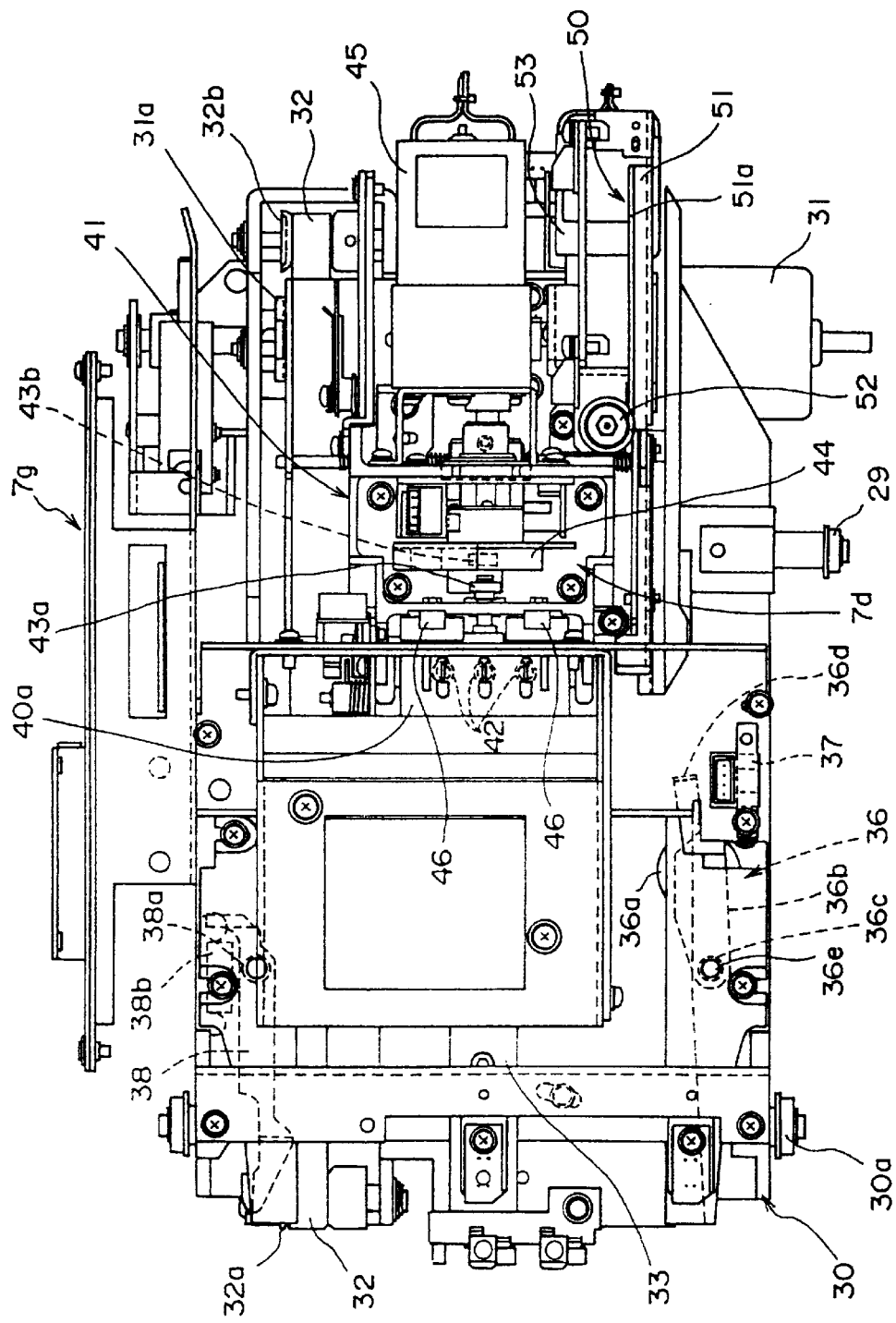
FIG. 13 is a plan view showing the picker section of the accessor according to this embodiment.
Figure 14:
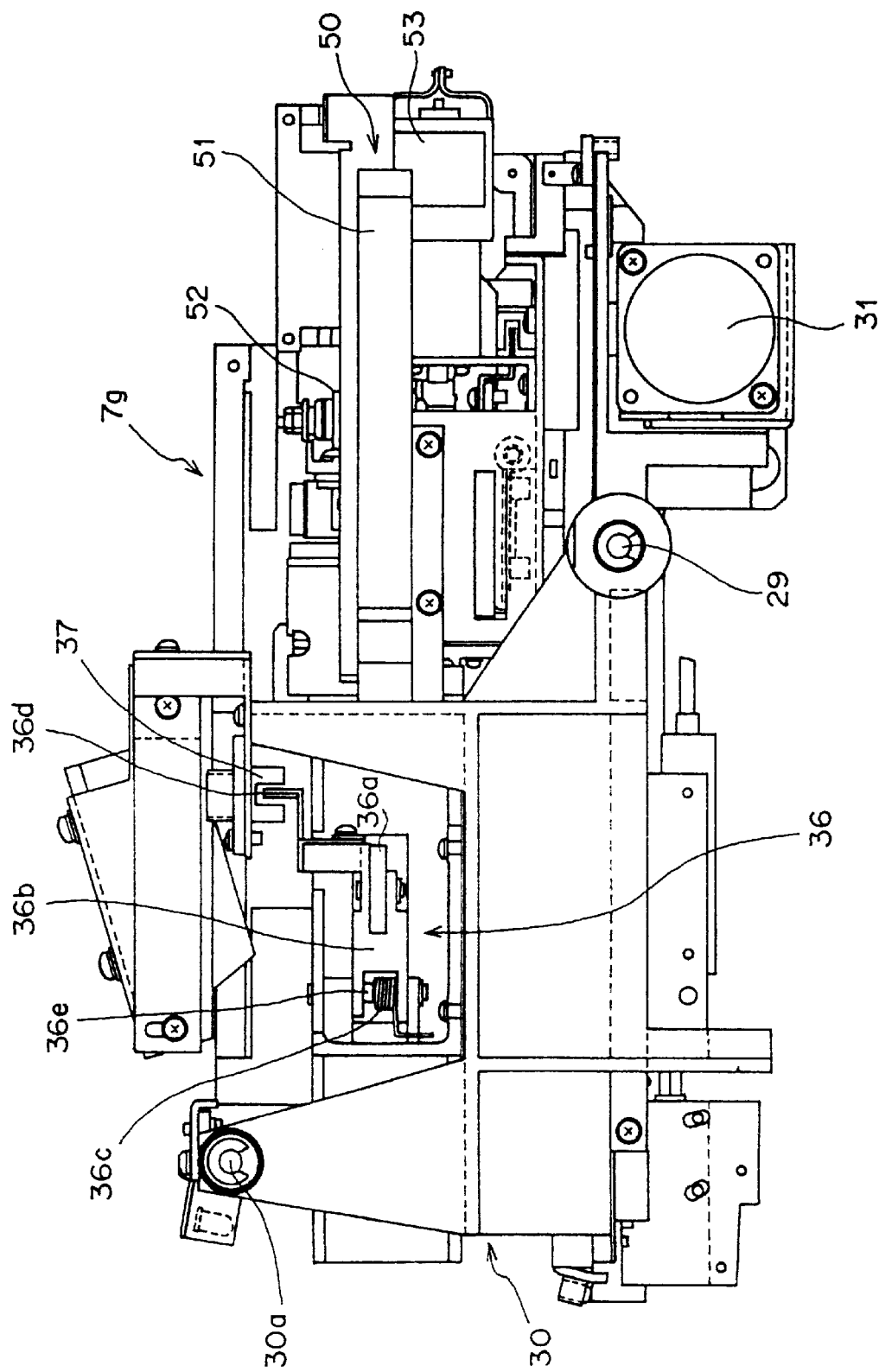
FIG. 14 is a side elevational view showing the picker section of the accessor according to this embodiment.
Figure 15:
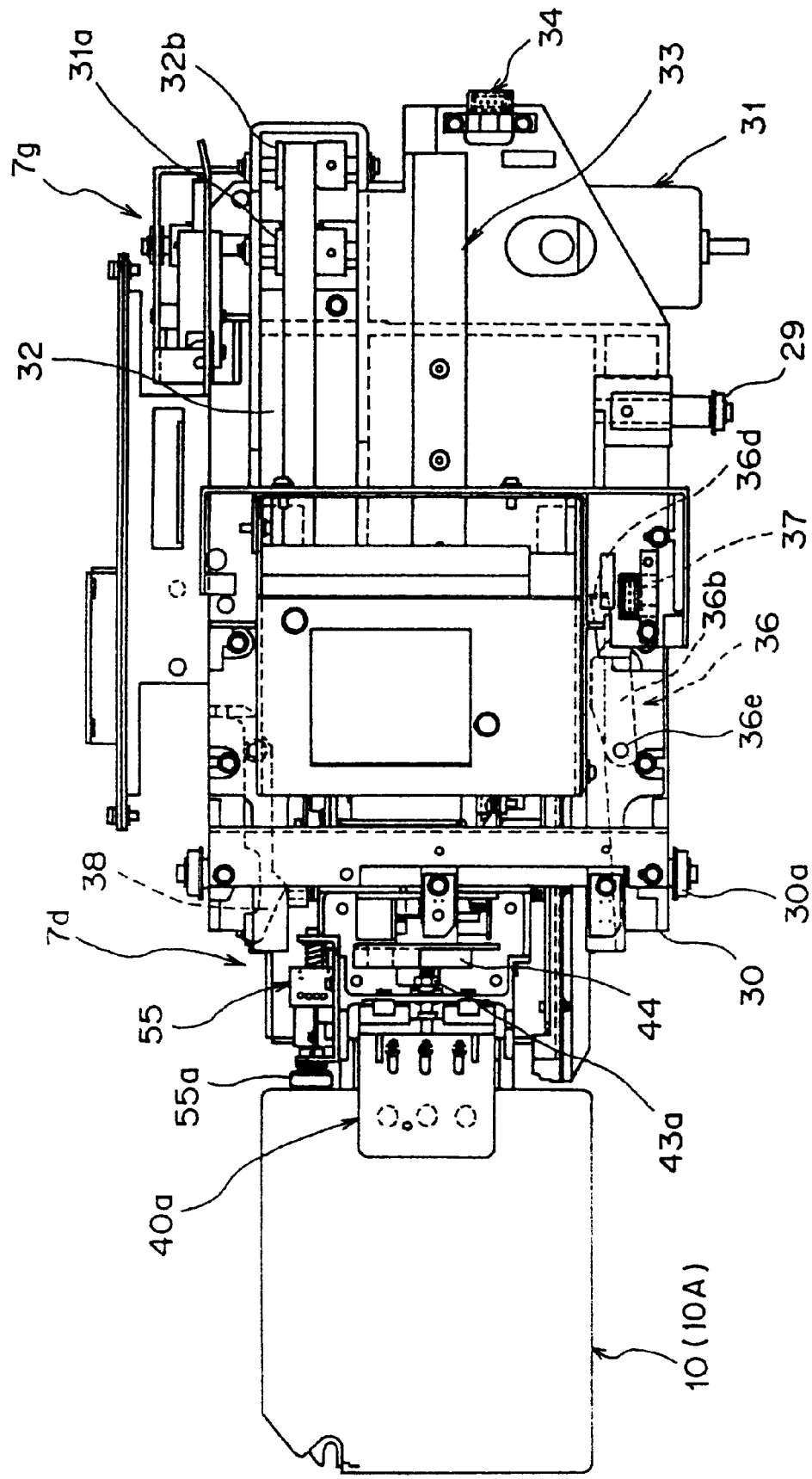
FIG. 15 is a plan view showing the advanced condition of the hand mechanism of the picker section of the accessor according to this embodiment.
Figure 16:
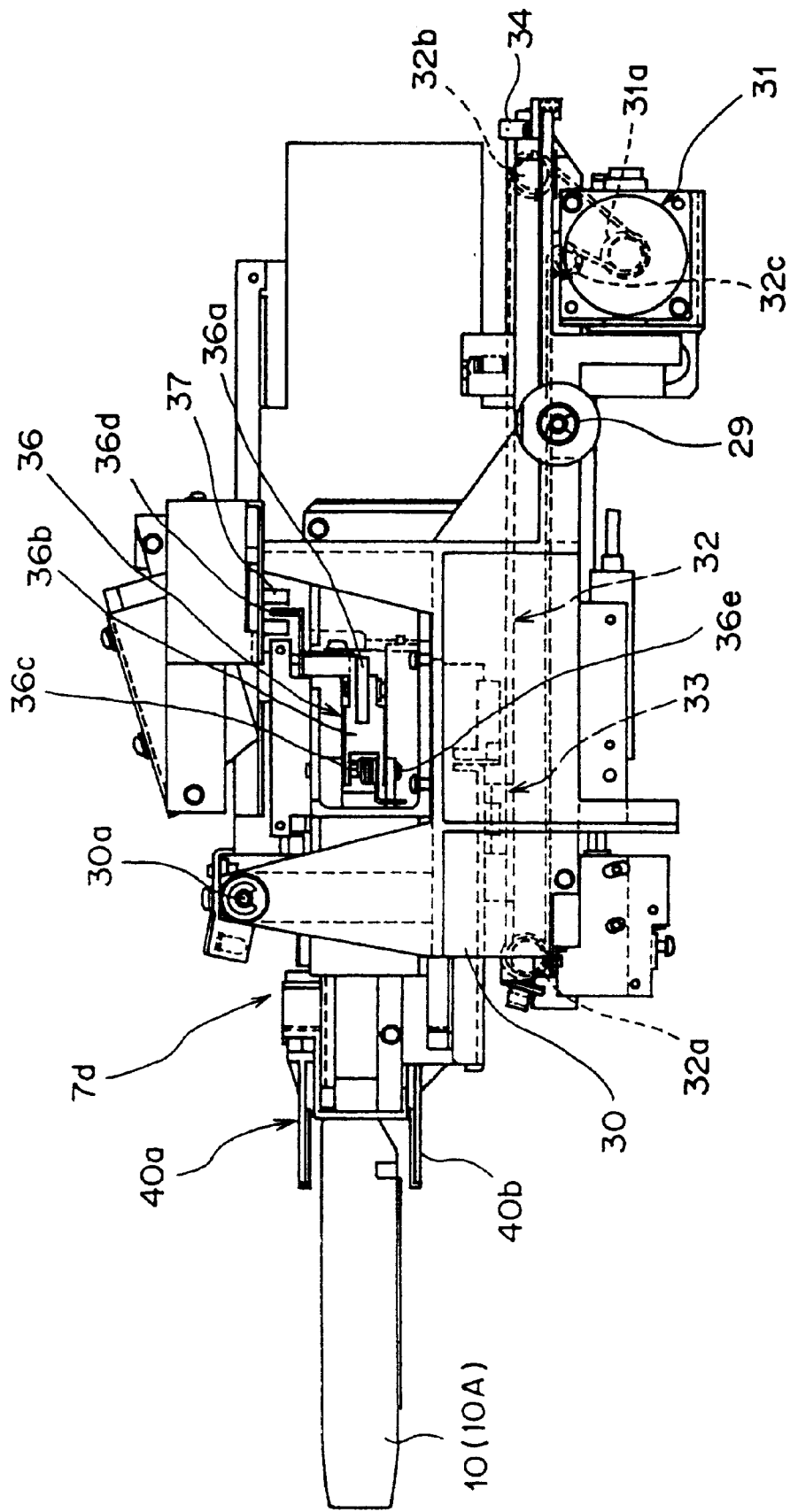
FIG. 16 is a side elevational view showing the advanced condition of the hand mechanism of the picker section of the accessor according to this embodiment.

FIGS. 12 to 16 are illustrations of the picker section 7g of the accessor 7 according to this embodiment, and of these drawings, FIG. 12 is a front elevational view of the picker section 7g, FIG. 13 is a plan view thereof, FIG. 14 is a side elevational view thereof, and FIGS. 15 and 16 are respectively plan and side elevational views showing the advanced condition of the hand mechanism 7d of the picker section 7g.

Figure 17:
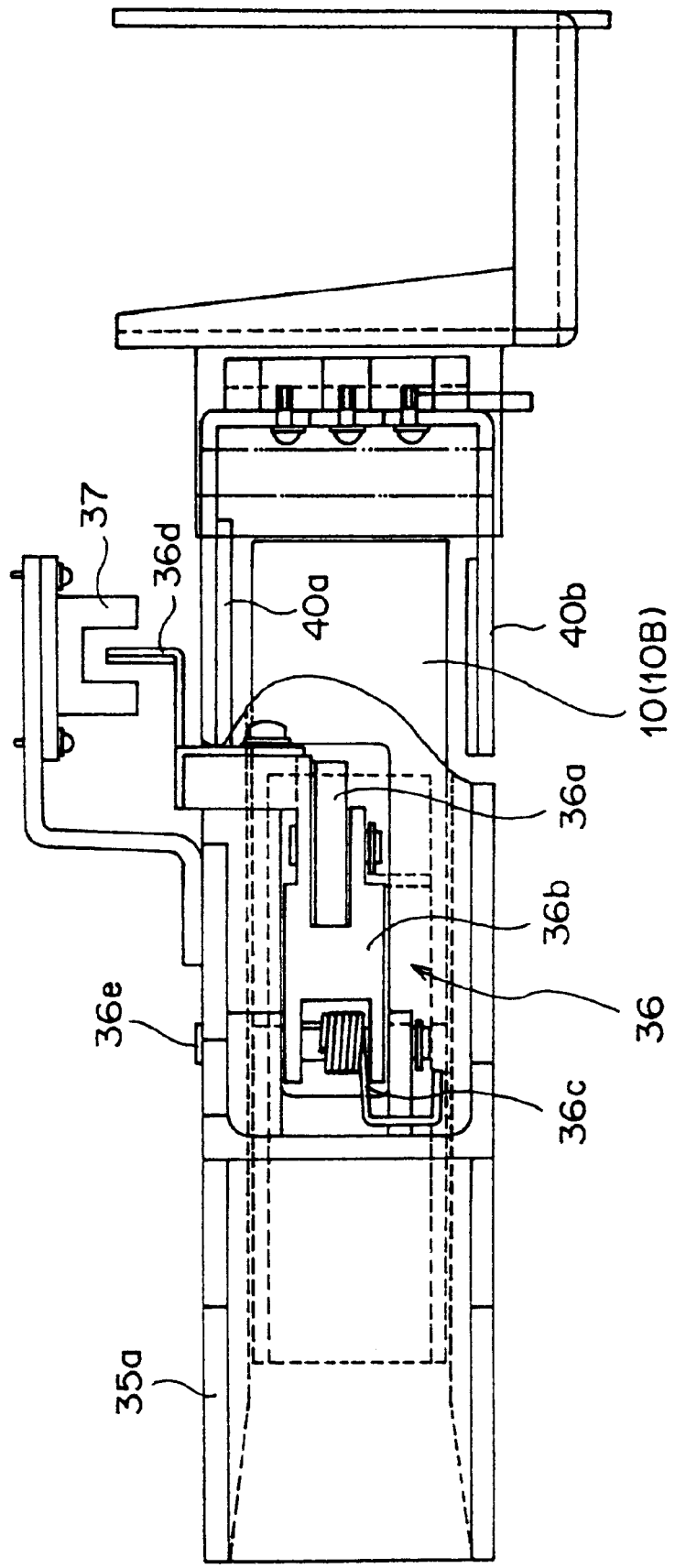
FIG. 17 is an illustration of a portion indicated by an arrow XVII in FIG. 1.
Figure 18:
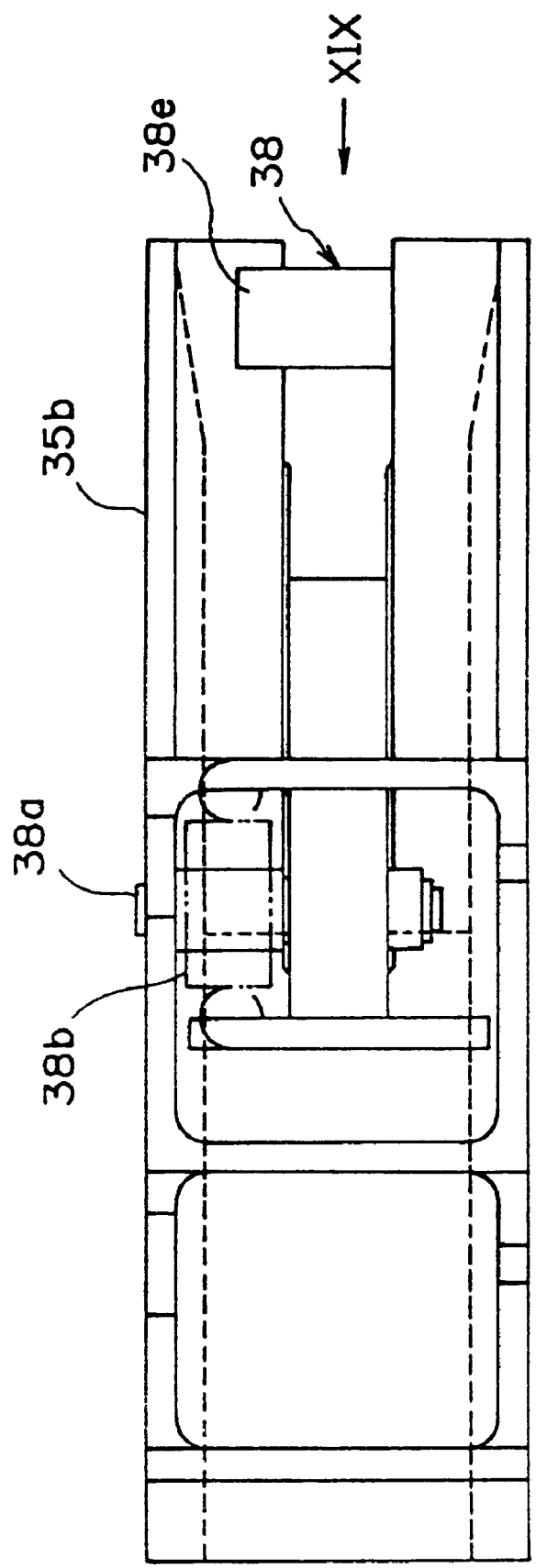
FIG. 18 is an illustration of a portion indicated by an arrow XVIII in FIG. 1.
Figure 19:
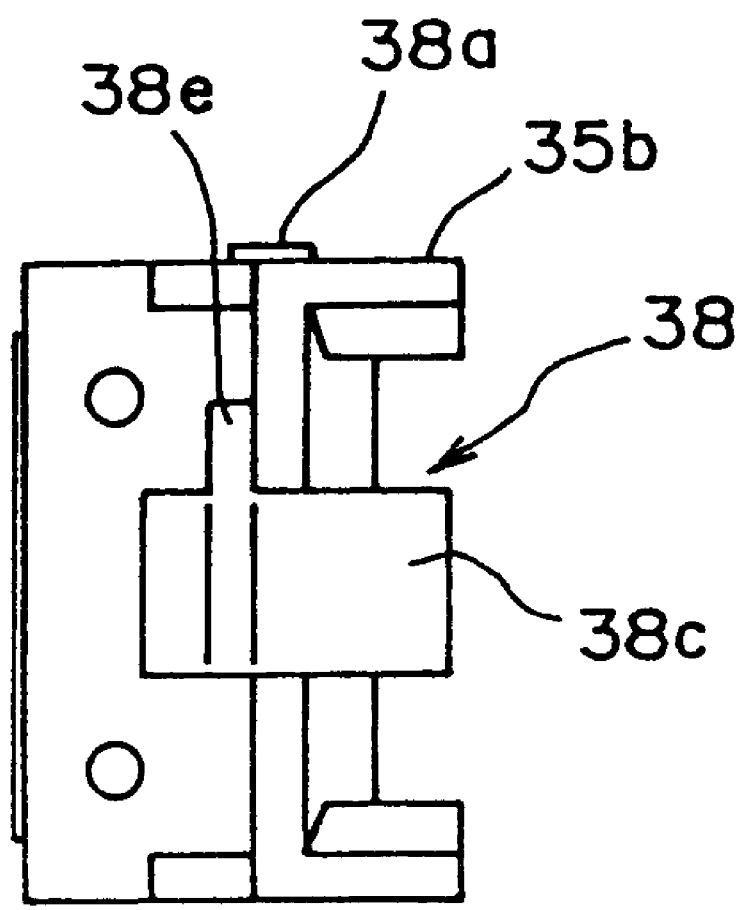
FIG. 19 is an illustration of a portion indicated by an arrow XIX in FIG. 18.

In addition, FIG. 1 is a plan view showing a principal portion (the guide members 35a, 35b, the actuator 36, the photosensor 37, the claw 38, and others) of the accessor 7 according to this embodiment. Further, FIG. 17 is an illustration of a portion indicated by an arrow XVII in FIG. 1, FIG. 18 is an illustration of a portion indicated by an arrow XVIII in FIG. 1, and FIG. 19 is an illustration of a portion indicated by an arrow XIX in FIG. 1.

In these illustrations, the reference numerals being the same as those in the above description represent the same or substantially same parts.

As shown in FIGS. 12 to 14, the hand mechanism 7d is mounted in the picker section 7g to be movable in the forward and backward directions, and is driven by the servo motor 31 and the timing belt 32 to slide in the forward and backward directions (left- and right-hand directions in FIG. 14) along the LM guide 33.

More specifically, the hand base 41 of the hand mechanism 7d is connected with the timing belt 32, and as shown in FIGS. 12, 13, 15 and 16, the timing belt 32 is wound around the pulleys 32a, 32b disposed on the front and rear sides of the picker base 30 and the pulley 31a connected to a drive shaft (not shown) of the servo motor 31, and guided with a guide roller 32c.

Accordingly, when the timing belt 32 is revolved by the servo motor 31, the hand base 41, that is, the whole hand mechanism 7d, is moved in the backward or forward direction to take the retracted condition (retreated position) shown in FIGS. 12 to 14 or the cartridge 10 giving and receiving condition (advanced position) shown in FIGS. 15 and 16.

Incidentally, to the rear end portion of the picker base 30, there is fitted a picker home sensor (photosensor) 34 which detects that the hand mechanism 7d is retracted up to the home position (retreated position).

On the other hand, in this embodiment, for treating a plurality of types of cartridges 10 within the library apparatus 1, a type identifying mechanism is placed in the picker section 7g to identify or discriminate the type of the cartridge 10 held in the picker section 7g in a state of being gripped by the hand mechanism 7d, and as will be described later, the type identifying mechanism is made up of an actuator 36 and a photosensor 37.

Figure 20:
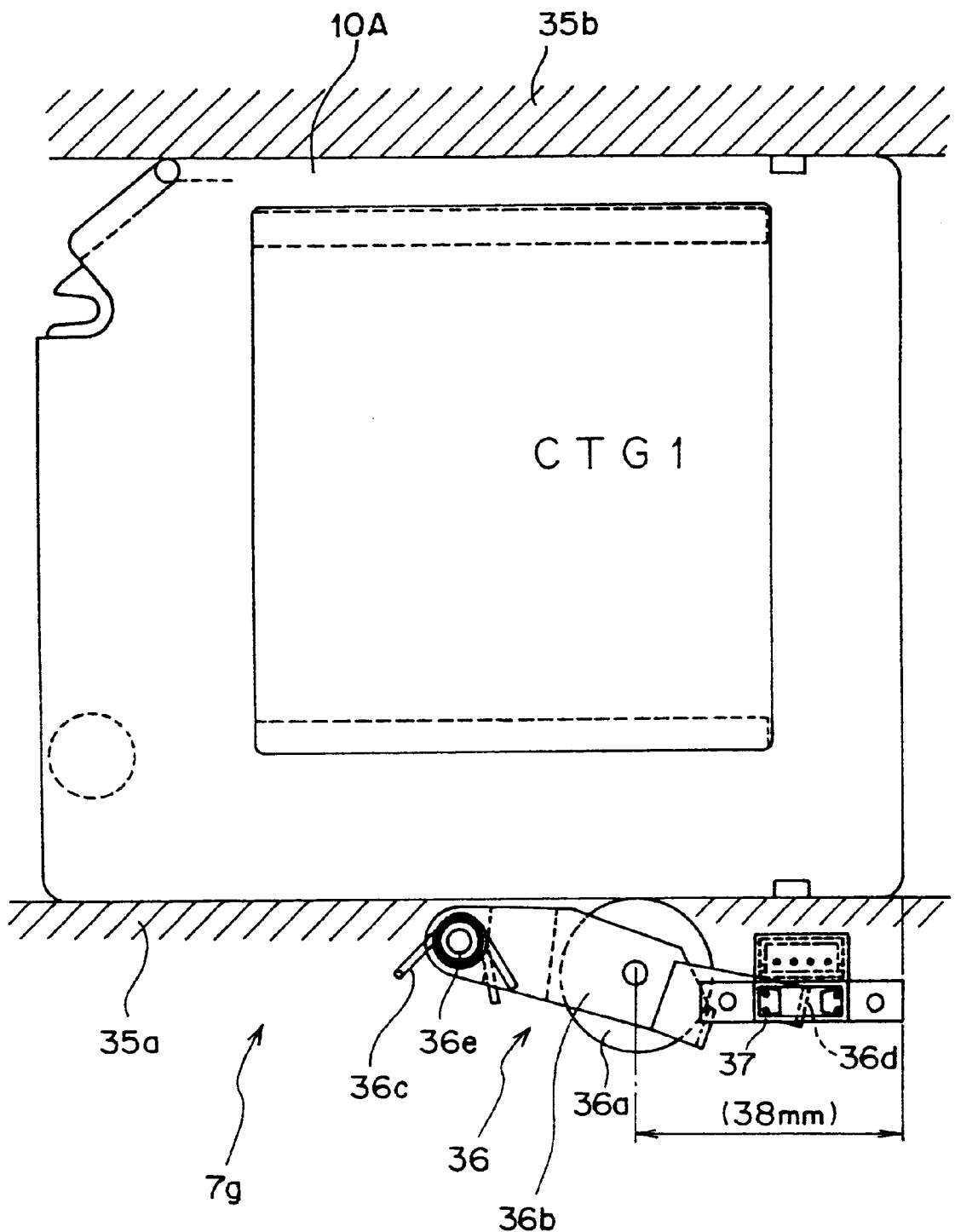
FIG. 20 is a plan view showing a state where a first type of cartridge is held in the picker section in this embodiment.
Figure 21:
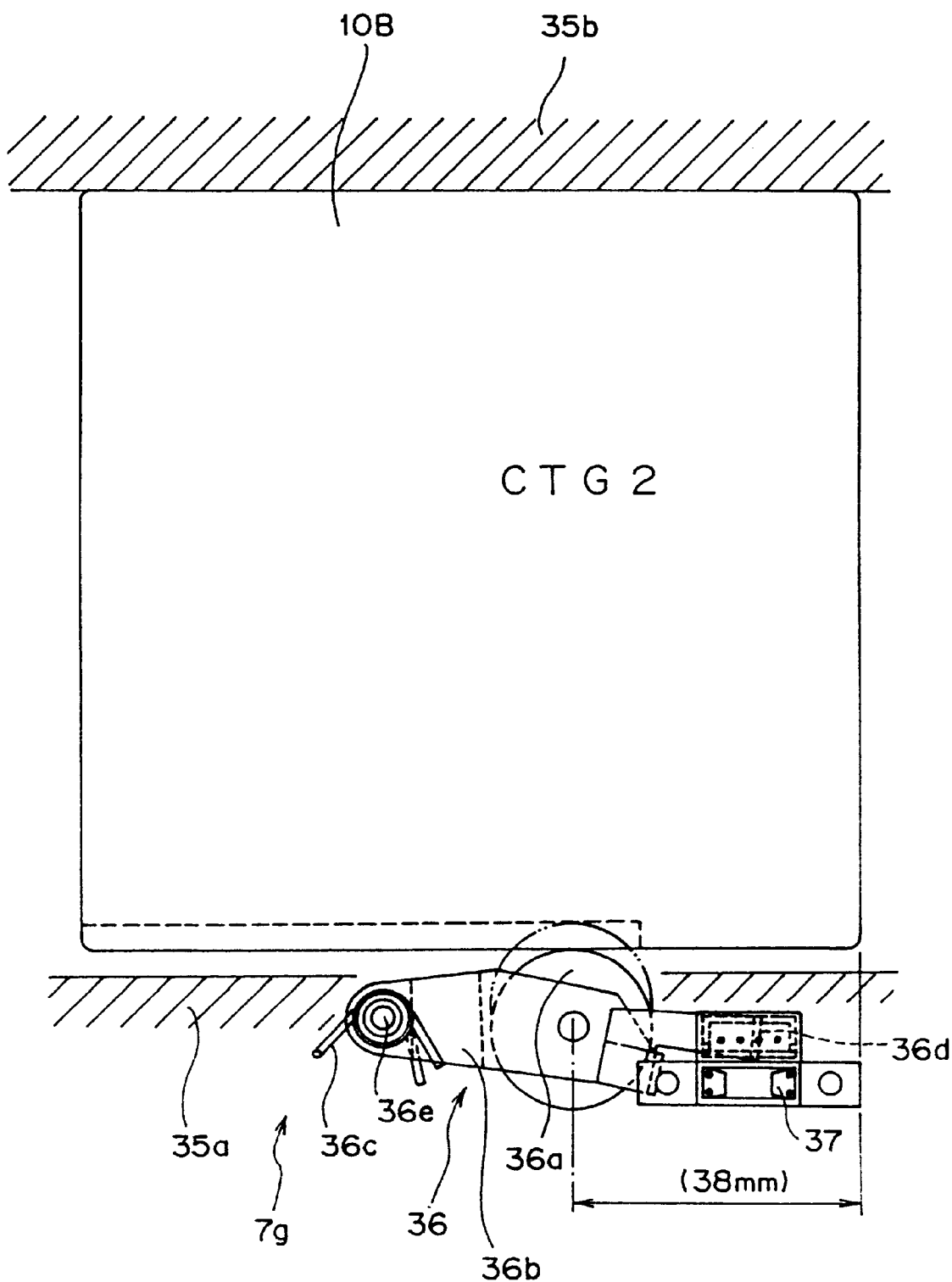
FIG. 21 is a plan view showing a state where a second type of cartridge is held in the picker section in this embodiment.
Figure 22:
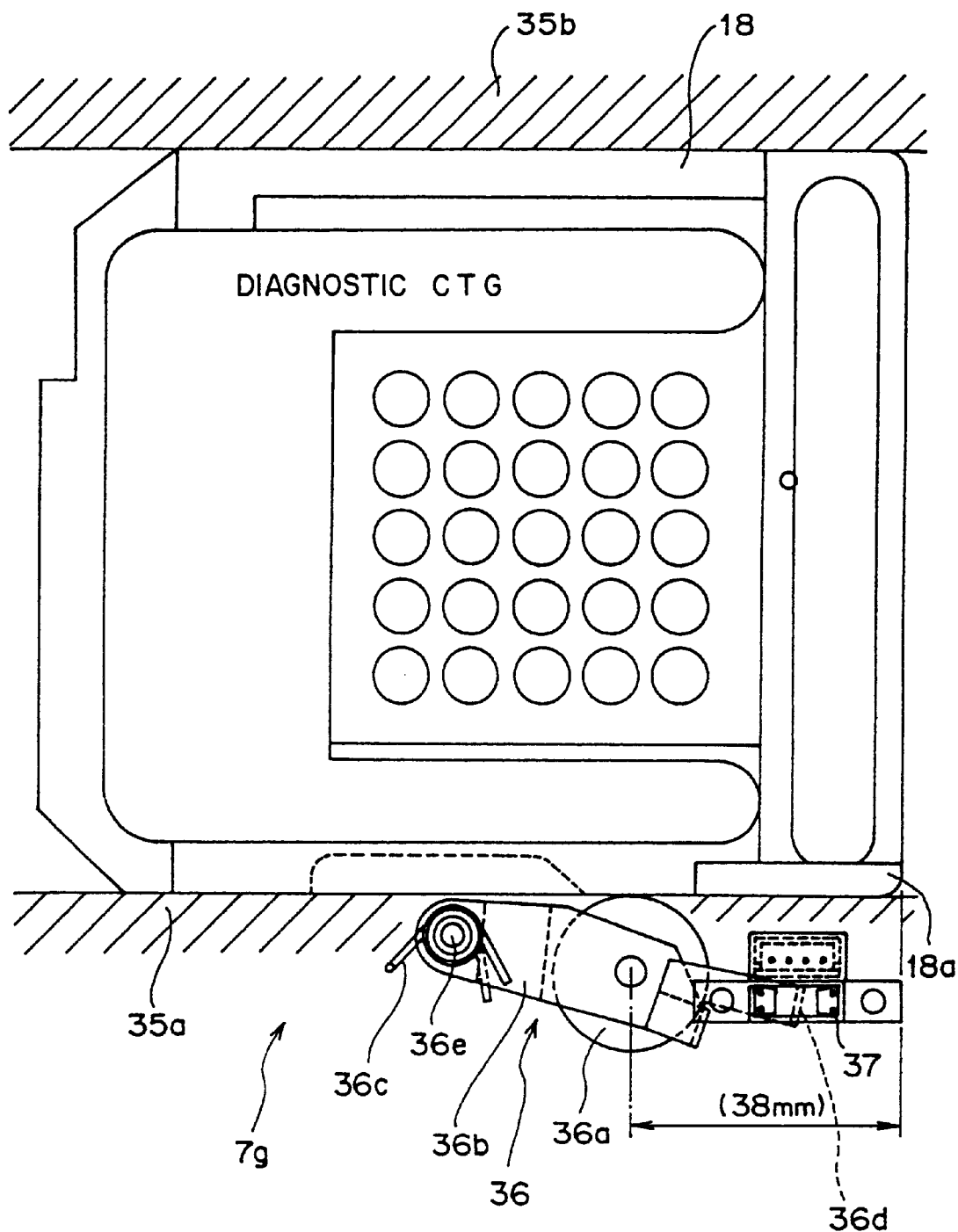
FIG. 22 is a plan view showing a state where a diagnostic cartridge (reference cartridge) is held in the picker section in this embodiment.

For instance, according to this embodiment, within the library apparatus 1, the accessor 7 handles, as the cartridge 10, a first type of cartridge (CTG1) 10A shown in FIG. 20, a second type of cartridge (CTG2) 10B shown in FIG. 21, and a diagnostic cartridge (diagnostic CTG, reference cartridge) 18 shown in FIG. 22.

The diagnostic cartridge 18 is used for diagnosing the dimensional accuracy of the accessor 7. In this embodiment, the accessor 7 has a diagnostic function by conducting the insertion and extraction of the diagnostic cartridge 18 into/ from a diagnostic cell (not shown) placed at a given position within the library apparatus 1. With the control of the operation of the accessor 7 reflecting the diagnostic results, the certain insertion and extraction of various types of cartridges becomes feasible. As shown in FIG. 22, the diagnostic cartridge 18 is made from a press or the like to have substantially the same configuration and weight as those of the first type of cartridge 10A. In addition, this diagnostic cartridge 18 is equipped with a notch portion 18a whereby the type identifying mechanism can recognize that it is the diagnostic cartridge 18.

In this embodiment, the type identifying mechanism is for the purpose of deciding which of the aforesaid first kind of cartridge 10A, second kind of cartridge 10B and diagnostic cartridge 18 is held by the picker section 7g. A description will be made in more detail hereinbelow of an arrangement of the picker section 7g including such a type identifying mechanism.

As shown in FIGS. 1, 12 and 13, the picker section 7g is provided with a pair of left- and right-hand guide members 35a, 35b, which are for guiding the cartridge 10 to be led into the picker section 7g in a state of being gripped by the hand mechanism 7d while holding the same cartridge 10 from both sides in such a manner that the opposite side surfaces of the cartridge 10 are substantially parallel with respect to the direction of guiding the cartridge 10. The separation between these paired guide members 35a and 35b is set to be slightly larger than the largest (in this embodiment, the first type of cartridge 10A or the diagnostic cartridge 18) of a plurality of types of cartridges 10.

Incidentally, FIG. 1 shows a state where the second type of cartridge 10B is held in the picker section 7g. Further, FIGS. 15 and 16 illustrate that the hand mechanism 7d (hand members 40a, 40b) is in the advanced condition in a state of gripping the first type of cartridge 10A.

Furthermore, in this embodiment, the type identifying mechanism is composed of the aforesaid actuator 36 made to move in accordance with the irregularity (variation in height) of one side surface of the cartridge 10 held in the picker section 7g, the photosensor 37 serving as a detection section for detecting the quantity of movements of this actuator 36, and an identifying section (not shown; a control CPU for taking the charge of control of the operation of the accessor 7) for identifying the type of the cartridge 10 on the basis of the movement quantity of the actuator 36 detected by the photosensor 37.

In this embodiment, as shown in FIGS. 1, 13, 14 and 17, the actuator 36 is located on one guide member 35a side and is, as mentioned before, composed of the roller 36a, the arm 36b, the coil spring 36c, the flag 36d and the rotary shaft 36e.

In this case, the roller 36a is disposed to protrude from the guide member 35a toward the cartridge side, and is made to rotate around a shaft perpendicular to the traveling plane of the cartridge 10 while coming into contact with one side surface of the cartridge 10. The arm 36b pivotally supports the roller 36a, and is fitted to the picker section 7g to be swingable (allowed to conduct opening and closing operations) around the rotary shaft 36e normal to the traveling plane of the cartridge 10 to swing in accordance with the irregularity (difference between external dimensions) of one side surface of the cartridge 10. The coil spring 36c is for biasing the arm 36b to press the roller 36a against the one side surface of the cartridge 10. The flag 36d is made to project from the arm 36b, and shifts in accordance with the swinging action of the arm 36b.

Furthermore, the photosensor 37 undergoes the light-interception by this flag 36d depending upon the flag 36d movement, and the aforesaid identifying section identifies the type of the cartridge 10 on the basis of the information about the light-interception from the photosensor 37.

Still further, in this embodiment, the operation of the accessor 7 is controlled so that the hand mechanism 7d regrips the cartridge 10 in a state where the cartridge 10 is introduced into the picker section 7g. At the cartridge 10 regripping operation by the hand mechanism 7d, the actuator 36 receives the biasing force of the coil spring 36c to press the other side surface of the cartridge 10 against the other guide member 35b, which finally serves as a positioning mechanism to always maintain the constant position of the other side surface of the cartridge 10 within the picker section 7g.

At this time, in the cartridge 10 regripping operation, for the purpose of preventing the cartridge 10 once released from the hand mechanism 7d from breaking out of the picker section 7g, the claw (locking member) 38 is placed on the guide member 35b side as shown in FIGS. 1, 12, 13, 18 and 19.

This claw 38 is disposed to protrude from the guide member 35b toward the cartridge side, and is swingable around a rotary shaft 38a and biased by an adequate force due to a spring 38b so that it is put out of the way by the cartridge 10 itself at the cartridge 10 inserting and extracting operations by the hand mechanism 7d while taking the locking condition with the cartridge 10 at the cartridge 10 regripping operation by the hand mechanism 7d.

In addition, tapered surfaces 38c, 38d are formed across the claw 38 to make the cartridge 10 easily get in and out of the picker section 7g. Further, as shown in FIGS. 18 and 19, for preventing the claw 38 from excessively protruding toward the cartridge side, the claw 38 has a projection 38e which can come into contact with the guide member 35b from the outside of this guide member 35b.

In this embodiment, since the picker section 7g of the accessor 7 includes the type identifying mechanism, the actuator 36 acting as a positioning mechanism and the breakout (jump-out) preventing claw 38 as mentioned above, the following effects are attainable.

As the basic operations, the accessor 7 conducts the operation to extract the cartridge 10 from the storage unit for the insertion (entry) of the cartridge 10 into the appointed MTU 5a and further the operation to receive (take out) the cartridge 10 discharged from the MTU 5a for the insertion (entry) of the cartridge 10 into the designated storage unit. A description will be made hereinbelow in connection with these two operations.

When the hand mechanism 7d extracts the cartridge 10 from the storage unit and introduces it into the interior of the picker section 7g, or when the hand mechanism 7d receives the cartridge 10 from the MTU 5a and takes it into the interior of the picker section 7g, the cartridge 10, regardless of the first type or the second type (or the diagnostic cartridge 18), is led into the picker section 7g while being guided by the pair of left- and right-hand guide members 35a, 35b, at this time the cartridge 10 being stored in the picker section 7g in such a manner that the opposite side surfaces of the cartridge 10 are substantially parallel with respect to the direction of guiding the cartridge 10 as they are guided by these guide members 35a, 35b.

At the moment that the cartridge 10 is introduced into the picker section 7g, that cartridge 10 is in the condition gripped by the hand members 40a, 40b of the hand mechanism 7d. Subsequently, for more accurately positioning the cartridge 10, the hand members 40a, 40b once release the cartridge 10.

At this time, the claw 38 acts to hold the tip portion of the cartridge 10 to prevent the once released cartridge 10 from jumping out of the picker section 7g due to vibrations, unexpected accidents, or abnormal actions of the accessor 7 itself. That is, when the hand mechanism 7d conducts the cartridge 10 releasing and regripping operations, even in case that the cartridge 10 moves from the interior of the picker section 7g toward the external, the cartridge 10 is locked with the claw 38 to be prevented from dropping from the interior of the picker section 7g to the external.

Since an appropriate biasing force due to the spring 38b works on the claw 38, when the hand mechanism 7d is moved by the servo motor 31 and the timing belt 32 in the forward and backward directions for the insertion and extraction of the cartridge 10, the claw 38 receives the drive force due to the servo motor 31 from the cartridge 10 to be put out of the way against the biasing force of the spring 38b so as not to limit the insertion and extraction of the cartridge 10. The biasing force of the spring 38b to act on the claw 38 is larger than the force by which the cartridge 10 pushes the claw 38 out of the way under its weight and smaller than the driving force of the servo motor 31. As a consequence, inside the picker section 7b, only the weight of the cartridge 10 having been released from the hand mechanism 7d does not suffice to push the claw 38 out of the way so that the cartridge 10 comes into locking engagement with the claw 38 with the cartridge end surface contacting the taper surface 38d of the claw 38.

When the hand members 40a, 40b are opened to release the cartridge 10, the cartridge 10 becomes free except for the restraint of gravitational friction. In this state, the roller 36a placed into contact with one side surface of the cartridge 10 receives the biasing force of the coil spring 36c to always press the other side surface of the cartridge 10 against the guide member 35b irrespective of its type.

Consequently, even in the case of handling various types of cartridges 10, it is possible to always position (reset) the cartridge 10 at a constant position ( reference position) where the other side surface of the cartridge 10 is placed into contact with the guide member 35b.

The cartridge 10 so positioned is regripped by the hand members 40a, 40b in this state. The cartridge 10 regripped and accurately positioned with respect to the hand members 40a, 40b (i.e., the accessor 7 itself) can also be positioned with respect to the MTU 5a or the storage unit, thus resulting in easy and certain insertion thereinto.

Moreover, when positioning the cartridge 10 (resetting the cartridge 10 to the reference position) within the accessor 7, even if the hand mechanism 7d releases the cartridge 10, the break-out preventing claw 38 works to always maintain the state in which the cartridge 10 is surely held in the picker section 7g, and hence, the cartridge 10 can be prevented from breaking out of the picker section 7g due to the vibrations and the abnormal actions of the accessor 7 itself.

Figure 24:
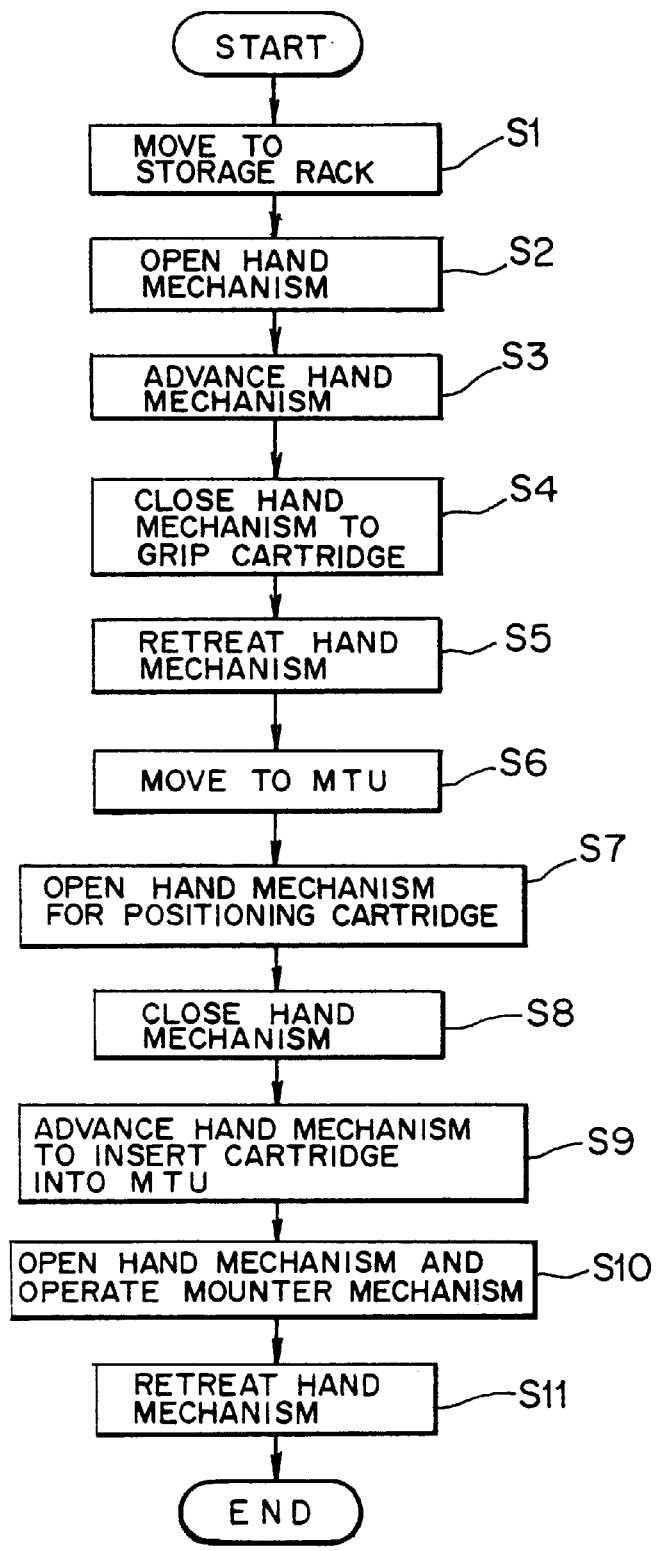
FIG. 24 is a flow chart useful for explaining a cartridge positioning operation in the picker section in this embodiment.

Referring to the flow chart (steps S1 to S11) of FIG. 24, a detailed description will be made hereinbelow of the cartridge positioning operation used when the cartridge 10 is extracted from the storage unit and then inserted into the MTU 5a.

The accessor 7 is shifted up to the storage unit storing the cartridge 10 designated, and the hand assembly 7a is moved to a position which takes an opposed relation to the same cartridge 10 (step S1). Further, after opening (spreading) the hand members 40a, 40b (step S2), the hand mechanism 7d is moved to advance (step S3) and the hand members 40a, 40b are closed to grip the cartridge 10 (step S4) and, subsequently, the hand mechanism 7d is retreated so that the cartridge 10 is introduced into the picker section 7g and held therein (step S5).

In a state where the cartridge is thus held in the interior of the picker section 7g, the accessor 7 is shifted to the designated MTU 5a and the hand assembly 7a is moved to a position being in an opposed relation to the cartridge insertion opening of that MTU 5a (step S6). Further, the hand members 40a, 40b are opened, and the positioning mechanism of the actuator 36 operates to press the cartridge 10 against the guide member 35b to place the cartridge at the reference position, thus accomplishing the reset operation (step S7). At this time, the claw 38 functions to prevent the break-out of the cartridge 10.

After the positioning of the cartridge 10, the hand members 40a, 40b are closed to regrip the cartridge 10 (step S8), and the hand mechanism 7d is moved to advance to insert the cartridge 10 into the cartridge insertion opening of the MTU 5a (step S9), and after this, the hand members 40a, 40b are opened and the mounter mechanism 50 is actuated to push the cartridge 10 into the interior of the MTU 5a (step S10), and then the hand mechanism 7d is retreated (step S11). On the completion of these operations, the cartridge 10 transferring work from the storage unit to the MTU 5a by the accessor 7 comes to an end.

Also in the case of taking the cartridge 10 discharged from the MTU 5a to insert it into the storage unit, the cartridge positioning operation is conducted in a similar way.

The actuator 36 moves (taking the opening and closing actions) in accordance with the irregularity (external dimension) of one side surface of the cartridge 10 introduced into the picker section 7g. Further, utilizing the fact that the movement quantity of the actuator 36 varies depending upon the external dimension of the cartridge 10 (the type of the cartridge 10), the identification of the type of the cartridge 10 becomes possible.

More specifically, when the cartridge 10 is taken into the interior of the picker section 7g by the hand mechanism 7d, the roller 36a rotates to allow the movement of the cartridge 10 while coming into contact with one side surface of the cartridge 10 owing to the biasing force of the coil spring 36c, thus making the arm 36b swing around the rotary shaft 36e in accordance with the irregularity of the one side surface thereof. In synchronism with the swinging action of the arm 36b, the flag 36d moves, so that the photosensor 37 detects the movement quantity of this flag 36d as the light-interception information, with the identifying section (not shown) identifying the type of the cartridge 10 on the basis of the light-interception information from the photosensor 37.

Furthermore, referring to FIGS. 20 to 23 and 25, a detailed description will be made hereinbelow of a method of identifying the type of the cartridge 10 according to this embodiment.

FIG. 20 is a plan view showing a state where the first type of cartridge (CTG1) 10A is held as the cartridge 10 in the picker section 7g, FIG. 21 is a plan view showing a state where the second type of cartridge (CTG2) 10B is held as the cartridge 10, and FIG. 22 is a plan view showing a state where the diagnostic cartridge (reference cartridge) 18 is held as the cartridge 10.

Figure 23:
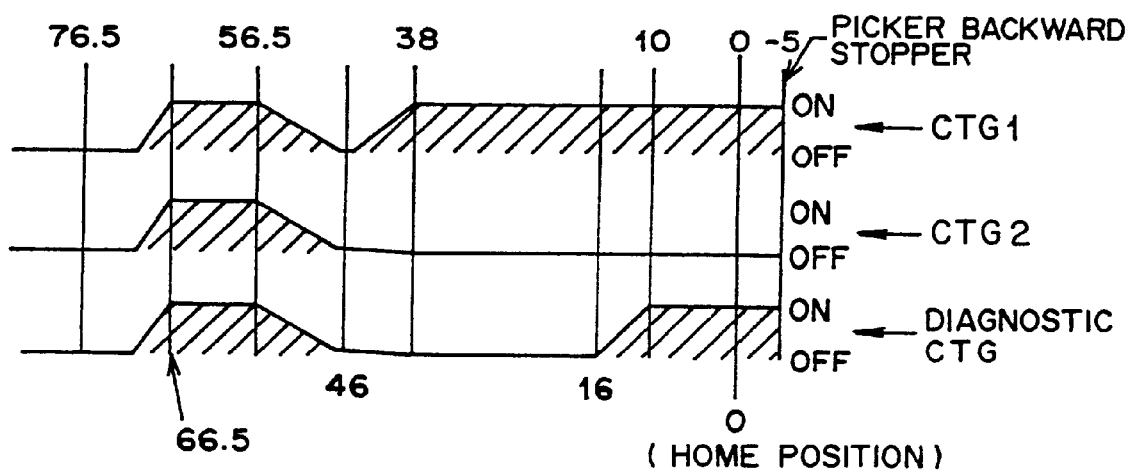
FIG. 23 is a graphic illustration of positions of various kinds of cartridges and outputs of a photosensor for describing a method of identifying the types of cartridges through the use of a type identifying mechanism.
Figure 25:
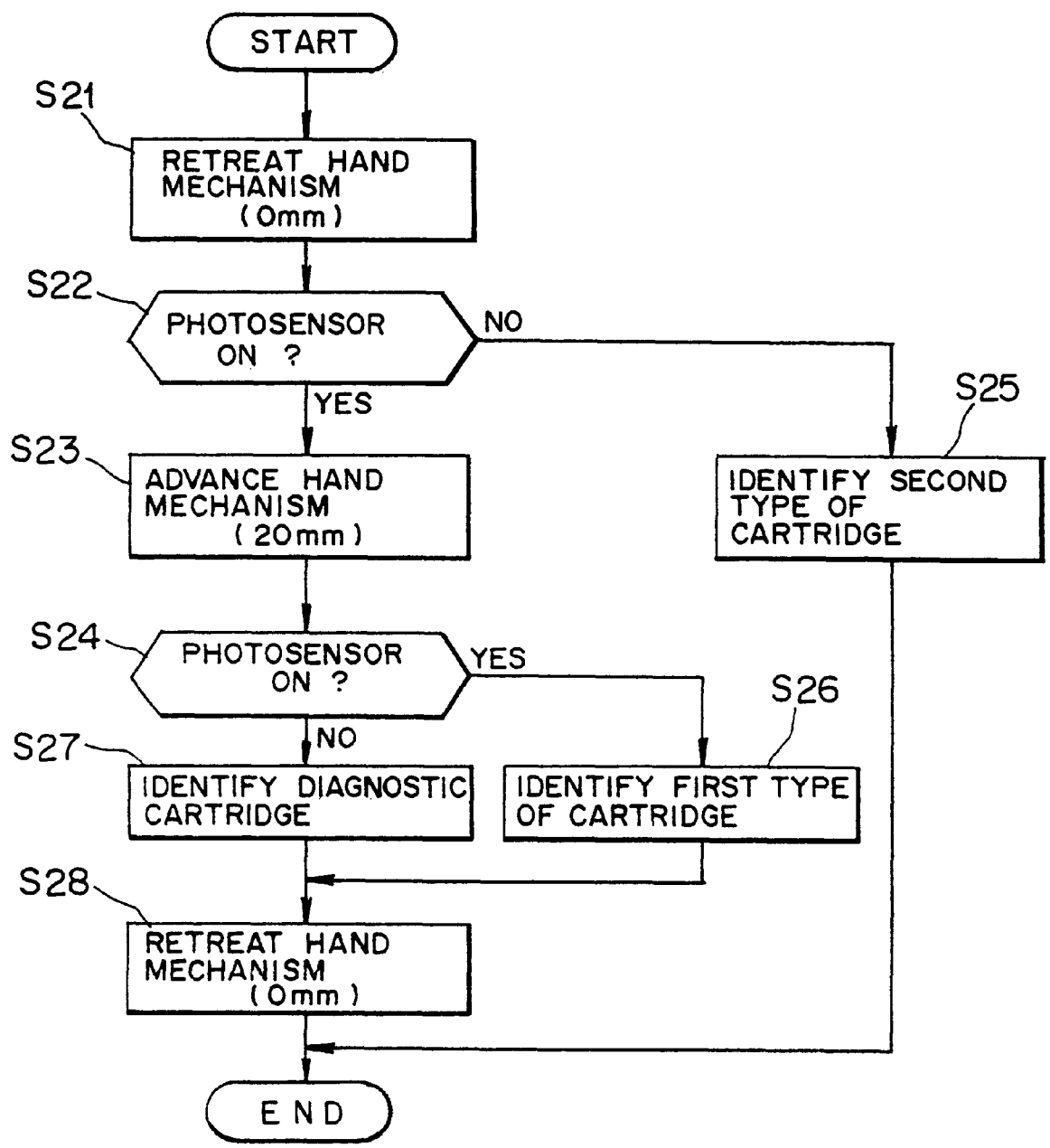
FIG. 25 is a flow chart available for describing a cartridge type identifying operation in an identifying section in this embodiment.

In addition, FIG. 23 is a graphic illustration of the relationship between the positions of the cartridges 10A, 10B, 18 and the outputs of the photosensor 37, and FIG. 25 is a flow chart (steps S21 to S28) useful for explaining the cartridge type identifying operation by the identifying section of the present embodiment.

As shown in FIG. 20, in a state where the first type of cartridge 10A reaches the home position (position corresponding to 0 mm in FIG. 23) of the picker section 7g, even if the cartridge 10A is pressed against the guide member 35b by the actuator 36, since only a slight gap occurs between the cartridge 10A and the guide member 35a, the arm 36b of the actuator 36 remains in the open condition, so that the flag 36d fitted to the arm 36b assumes the photosensor 37 intercepting condition (ON state). Further, in cases where the first type cartridge 10A is held within the picker section 7g, as shown at an upper portion of FIG. 23, the flag 36d stays to be in the photosensor 37 intercepting condition (ON state) until the hand mechanism 7d advances the cartridge 10A by a quantity more than 38 mm.

On the other hand, in a state where the second type of cartridge 10B is at the home position of the picker section 7g as shown in FIG. 21, if this cartridge 10B is pressed against the guide member 35b by the actuator 36, due to the difference in external dimension, the arm 36a of the actuator 30 comes into the closed condition, and the flag 36d takes the photosensor 37 non-intercepting condition (OFF state). Further, in case where the second type of cartridge 10B is held within the picker section 7g, as shown at an intermediate portion of FIG. 23, the flag 36d continues to take the photosensor 37 non-intercepting condition (OFF state) until the hand mechanism 7d advances the cartridge 10B by a quantity above 46 mm.

Moreover, in a state where the diagnostic cartridge 18 is at the home position of the picker section 7g as shown in FIG. 22, as well as the first type of cartridge 10A, the arm 36b of the actuator 36 remains in the open condition, and the flag 36d attached to the arm 36b assumes the photosensor 37 intercepting condition (ON state). Accordingly, in this case, it is impossible to distinguish between the diagnostic cartridge 18 and the first type of cartridge 10A.

For this reason, in this embodiment, a notch portion 18a is previously made in a side surface of the diagnostic cartridge 18 coming into contact with the roller 36a of the actuator 36, and the discrimination between the diagnostic cartridge 18 and the first type of cartridge 10A is accomplished by this notch portion 18a on the basis of the fact that the arm 36b of the actuator 36 comes into the closed condition. That is, as shown at a lower portion of FIG. 23, when the diagnostic cartridge 18 is at the home position, the output of the photosensor 37 is in the ON state. On the other hand, if the diagnostic cartridge 18 is advanced by above 16 mm through the hand mechanism 7d, the arm 36b of the actuator 36 gets into the closed condition, and the flag 36d comes into the photosensor 37 non-intercepting condition, and hence, the output of the photosensor 37 switches to the OFF state.

In this embodiment, within the picker section 7g, the cartridge 10 can further be pulled inwardly by 5 mm from the home position, and a picker backward stopper (not shown) is provided in order to inhibit the cartridge 10 from being still further pulled inwardly from that position. At the position of −5 mm in FIG. 23, there is shown the output of the photosensor 37 which occurs when the cartridge 10 is introduced up to the picker backward stopper.

In this embodiment, on the basis of the above-mentioned ON/OFF outputs of the photosensor 37, the identification of the type of the cartridge 10 is made in accordance with the flow chart (steps S21 to S28) of FIG. 25.

In case where any cartridge 10 is held in the picker section 7g in a state of being gripped by the hand mechanism 7d, the hand mechanism 7d is retreated up to the home position (position of 0 mm) (step S21), and a decision is made whether or not the photosensor 37 is in the ON state (step S22). At this time, if the photosensor 37 is in the OFF state ("NO" route from step S22), as shown in FIGS. 21 and the intermediate portion of FIG. 23, a decision is made to that that cartridge 10 is the second type of cartridge 10B (step S25), thus terminating the cartridge type identifying operation.

On the other hand, if the photosensor 37 is in the ON state ("YES" route from step S22), that cartridge 10 is the first type of cartridge 10A or the diagnostic cartridge 18. Accordingly, for the discrimination therebetween, the hand mechanism 7d is advanced by 20 mm (step S23), and a decision is again made whether or not the photosensor 37 is in the ON state (step S24).

At this time, if the photosensor 37 is in the ON state ("YES" route from step S24), as shown in FIG. 20 and the upper portion of FIG. 23, a decision is made to that the cartridge 10 is the first type of cartridge 10A (step S26). On the other hand, if the photosensor 27 is in the OFF state ("NO" route from step S24), as shown in FIGS. 22 and the lower portion of FIG. 23, a decision is made to that the cartridge 10 is the diagnostic cartridge 18 (step S27).

After the execution of the step S26 or S27, the hand mechanism 7d is retreated up to the home position (the position of 0 mm) (step S28), thereby terminating the cartridge type identifying operation.

The above-described cartridge type identifying operation is commonly done when the cartridge 10 is forwarded from the picker section 7g.

According to this embodiment, in this way, in the accessor 7, the identification of the type of the cartridge 10 held in the picker section 7g is possible, and therefore, the processing (conveyance and insertion of cartridges to/into the storage unit or the MTU 5a, and other operations) corresponding to the identification result is certainly feasible, and since a plurality of types of cartridges 10 can simultaneously be handed within one library apparatus 1, the certain conveyance of the plurality of types of cartridges 10 is possible, thus providing a more useful apparatus to the users and further meeting a variety of needs from the users.

Moreover, it is possible to position the cartridge 10 (reset the cartridge 10 to the reference position) concurrently with identifying the type of the cartridge 10 within the accessor 7, which permits the cartridge 10 to be easily inserted into the storage unit or the MTU 5a in accordance with its type.

Furthermore, when positioning the cartridge 10 (resetting the cartridge 10 to the reference position) within the accessor 7, even if the hand mechanism 7d releases the cartridge 10, the break-out preventing claw 38 works to always maintain the state in which the cartridge 10 is surely held in the picker section 7g, and hence, the cartridge 10 is prevented from breaking out of the picker section 7g due to the vibrations and the abnormal actions of the accessor 7 itself, with the result that the library apparatus 1 is operable with a high reliability.

Still further, in this embodiment, the accessor 7 is capable of identifying not only the cartridge 10 accommodating a storage medium such as a magnetic tape but also a diagnostic cartridge 18, and in case where the hand mechanism 7d grips the diagnostic cartridge 18, the corresponding operation becomes possible.

Thus, for diagnosing or checking whether or not the dimension of the accessor 7 itself is out of order, even using a special-purpose cartridge 18 for diagnosis, it is possible to recognize that the cartridge 18 used is for the purpose of the diagnosis, and therefore, the diagnosing operation for the accessor 7 itself is smoothly and surely feasible.

At the switching from the diagnosis to the normal operation, even if the hand mechanism 7d is in the state of gripping the diagnostic cartridge 18, because of the recognition thereof, it is possible to prevent the undesirable operation that the apparatus 1 gets into the normal action while the hand mechanism 7 grips the diagnostic cartridge 18.

[7] Others

Although the above-described embodiment relates to the case in which the three types of cartridges: the first and second types of cartridges 10A, 10B each accommodating a storage medium and the diagnostic cartridge 18, are handled as the cartridge 10 within the library apparatus 1 and distinguished from each other, the present invention is not limited to this case, but is also applicable to a case of handling more types of cartridges, as well as the above-described embodiment.

It should be understood that the present invention is not limited to the above-described embodiment, and that it is intended to cover all changes and modifications of the embodiment of the invention herein used for the purpose of the disclosure, which do not constitute departures from the spirit and scope of the invention.

What is claimed is:

1. A cartridge transferring robot for a library apparatus including at least one storage unit for storing a multiplicity of cartridges and accommodating each of different storage media, a cartridge entry/exit station for conducting entry/exit of the cartridges one at a time, and a drive unit for carrying out access to the storage medium accommodated in a selected one of the stored cartridges, said cartridge transferring robot comprising:

a picker section including a hand mechanism for gripping the selected cartridge for insertion and drawing of the cartridge;

a moving mechanism for moving said picker section to a given position, to transfer the cartridge within said library apparatus; and a pair of left- and right-hand guide members for guiding the cartridge into said picker section in a state such that the cartridge is gripped by said hand mechanism and is disposed between said guide members while said guide members are opened slightly larger than the largest of various sizes and types of cartridges;

wherein said picker section is equipped with a type identifying mechanism for identifying the type of the cartridge held in said picker section and gripped by said hand mechanism, said type identifying mechanism including a detection section for discriminating undulation of one side surface of the cartridge held in said picker section, and an identifying section for identifying the type of the cartridge based on the result of discrimination by said detection section.

2. A cartridge transferring robot for a library apparatus as defined in claim 1, wherein said detection section includes:

a roller rotatable about a shaft perpendicular to a moving plane of the cartridge while coming into contact with aid one side surface of the cartridge;

an arm pivotally connected at one end to a shaft perpendicular to the moving plane of the cartridge and supporting at a position toward the other end of said shaft of said roller, said arm being swingable about the second-named shaft as said roller moves in a rise-and-fall manner along said undulation of said one side surface of the cartridge;

a spring biasing said arm so as to normally press said roller against the one side surface of the cartridge; and a flag projecting from said arm and movable in response to the swinging movement of said arm along with the rise-and-fall movement of said roller;

said detection section including a photosensor which is to be intercepted by said flag depending on its movement;

said identifying section being operable to identify the type of the cartridge on the basis of information about a pattern of intercepting of said photosensor.

3. A cartridge transferring robot for a library apparatus as defined in claim 2, wherein said hand mechanism is controlled to regrip the cartridge when the cartridge is introduced into said picker section, whereupon said roller presses the other side surface of the cartridge against one of said guide members under the biasing force of said spring to position the cartridge exactly in said picker section.

4. (Amended) A cartridge transferring robot for a library apparatus as defined in claim 3, wherein at least one said guide member is provided with a locking member projecting toward the cartridge, said locking member being pivotally movable out of the way by the cartridge when the cartridge is inserted into or drawn from the storage unit and the drive unit by said hand mechanism, said locking member being lockingly engageable with the cartridge when the cartridge is regripped by said hand mechanism.

5. A cartridge transferring robot for a library apparatus as defined in claim 1, wherein said robot has a diagnostic function of checking dimensional accuracy of said robot in terms of a displacement of the operating axis of said robot using a diagnostic cartridge, which is to be inserted and extracted into and from a diagnostic cell placed in said library apparatus, and said type identifying mechanism is operable to identify said diagnostic cartridge as one of said various types of cartridges.

6. A cartridge transferring robot for a library apparatus as defined in claim 2, wherein said robot has a diagnostic function of checking dimensional accuracy of said robot in terms of a displacement of the operating axis of said robot using a diagnostic cartridge, which is to be inserted and extracted into and from a diagnostic cell placed in said library apparatus, and said type identifying mechanism is operable to identify said diagnostic cartridge as one of said various types of cartridges.

7. A cartridge transferring robot for a library apparatus as defined in claim 3, wherein said robot has a diagnostic function of checking dimensional accuracy of said robot in terms of a displacement of the operating axis of said robot using a diagnostic cartridge, which is to be inserted and extracted into and from a diagnostic cell placed in said library apparatus, and said type identifying mechanism is operable to identify said diagnostic cartridge as one of said various types of cartridges.

8. A cartridge transferring robot for a library apparatus as defined in claim 4, wherein said robot has a diagnostic function of checking dimensional accuracy of said robot in terms of a displacement of the operating axis of said robot using a diagnostic cartridge, which is to be inserted and extracted into and from a diagnostic cell placed in said library apparatus, and said type identifying mechanism is operable to identify said diagnostic cartridge as one of said various types of cartridges.

* * * * *

UNITED STATES PATENT AND TRADEMARK OFFICE
CERTIFICATE OF CORRECTION

PATENT NO. : 6,022,180
DATED : February 8, 2000
INVENTOR(S) : Motoyama et al.

It is certified that error appears in the above-identified patent and that said Letters Patent is hereby corrected as shown below:

Title Page:
Under item "[57] Abstract", please delete the Abstract in its entirety and insert -- A cartridge transfering robot for use in a library apparatus which is capable of accurately transferring a plurality of type of cartridges (media) to meet various needs from the users. A plurality of types of cartridges are handled within the library apparatus, while a picker section includes a type identifying mechanism to identify the type of the cartridge held in the picker section and gripped by a hand mechanism. The cartridges are tranferred among storage unit, a cartridge entry exit station and a drive unit within a library apparatus storing a large number of cartridges such as magnetic tape cartridges and optical disk cartridges. --therefor Claims:
Claim 2, line 5, please delete "aid" and insert --said-- therefor Signed and Sealed this Third Day of July, 2001

*Attest:*

NICHOLAS P. GODICI
*Attesting Officer*    *Acting Director of the United States Patent and Trademark Office*